United States Patent [19]
Seidner et al.

[11] Patent Number: 5,333,064
[45] Date of Patent: Jul. 26, 1994

[54] APPARATUS & METHOD FOR DESCREENING

[75] Inventors: Daniel Seidner, Herzliya; Dan Eylon, Tel Aviv, both of Israel

[73] Assignee: Scitex Corporation, Ltd., Herzliya, Israel

[21] Appl. No.: 750,515

[22] Filed: Aug. 27, 1991

[30] Foreign Application Priority Data

Apr. 30, 1991 [IL] Israel .................................. 98004

[51] Int. Cl.⁵ .............................................. H04N 1/40
[52] U.S. Cl. .................................... 358/456; 358/443; 358/455; 358/457; 358/536; 358/534; 358/528; 382/54; 382/47
[58] Field of Search ............... 358/456, 457, 458, 75, 358/448, 428, 429, 80, 443, 451, 455, 462, 448, 536, 534, 465, 528; 382/54, 47, 41, 43

[56] References Cited

U.S. PATENT DOCUMENTS

| | | |
|---|---|---|
| 4,288,821 | 9/1981 | Lavallee et al. .................... 358/456 |
| 4,554,594 | 11/1985 | Ciardiello et al. .................. 358/456 |
| 4,680,720 | 7/1987 | Yoshii et al. ........................ 358/456 |
| 4,907,096 | 3/1990 | Stansfield et al. ................. 358/456 |
| 5,027,078 | 6/1991 | Fan ....................................... 358/456 |
| 5,131,059 | 7/1992 | Kobayashi et al. ................. 358/456 |

Primary Examiner—Edward L. Coles, Sr.
Assistant Examiner—Fan Lee
Attorney, Agent, or Firm—Ladas & Parry

[57] ABSTRACT

Apparatus and method for descreening and for performing resolution changes on a half-tone image in order to produce a continuous tone image. The apparatus includes filter apparatus for removing screen information from the half-tone image including a plurality of different filters each providing interpolation and screen removal functions and a controller for selecting per pixel of the continuous tone image and as a function of desired resolution changes, one of the filters for operation on a neighborhood of the pixel.

61 Claims, 26 Drawing Sheets

```
MAIN();
{
    FIND_FIRST_POINT();
    FIND_NEXT();
    CALCULATED ANGLE AND CELL SIZE FROM (X_1,Y_1), (X_N,Y_N)
        AND N;
}
```

FIG.10A

```
FIND_NEXT();
{
    SEARCH IN THREE DIRECTIONS (RIGHT, 45°, DOWN) AND
        STORE RESULTS;
    {
        GO_NEXT(DIRECTION);
        FIND_MAX(X,Y);
        FIND_CENTER_OF_GRAVITY(X,Y);
    }
    TEST_RESULTS(X,Y);
    IF VALID RESULT THEN
    {
        FIND_NEXT();
    }
}
```

FIG.10B

```
GO_NEXT(DIRECTION);
{
    START FROM THE MAXIMUM VALUE;
    GO IN THE REQUESTED DIRECTION (RIGHT, 45°, DOWN)
        UNTIL GRADIENT CHANGES;
}
```

FIG.10C

```
FIND_MAX(X,Y);
{
    FIND WHICH OF P1, P2, P3 OR P4 HAS THE
        MAXIMUM VALUE;
    IF P3 = P2 AND BOTH HAVE THE MAXIMUM VALUE,
        THEN SET P2 TO BE THE MAXIMUM;
    IF P4 = P2 OR P4 = P3 AND BOTH HAVE THE
        MAXIMUM VALUE, THEN SET P4 TO BE THE MAXIMUM;

A) IF P2 HAS THE MAXIMUM VALUE, FIND_MAX(X+1,Y);
    B) IF P3 HAS THE MAXIMUM VALUE, FIND_MAX(X,Y+1);
    C) IF P4 HAS THE MAXIMUM VALUE, FIND_MAX(X+1,Y+1);
    D) IF P1 HAS THE MAXIMUM VALUE, RETURN;
}
```

FIG.10D

```
FIND_CENTER_OF_GRAVITY(X,Y);
{
    CALCULATE_CENTER_OF_GRAVITY(X,Y);
    IF (X_COG - X)² + (Y_COG - Y)² > D² THEN
    {
        X = X_COG;
        Y = Y_COG;
        FIND_CENTER_OF_GRAVITY(X,Y);
    }
}
```

FIG.10E

```
CALCULATE_CENTER_OF_GRAVITY(X,Y);
{
```

$$X_{COG} = \frac{\int_{X-W/2}^{X+W/2} X\left[\int_{X-W/2}^{X+W/2} P(x,y)dy\right]dx}{\int_{X-W/2}^{X+W/2}\left[\int_{Y-W/2}^{Y+W/2} P(x,y)dy\right]dx};$$

$$Y_{COG} = \frac{\int_{X-W/2}^{X+W/2} Y\left[\int_{X-W/2}^{X+W/2} P(x,y)dx\right]dy}{\int_{X-W/2}^{X+W/2}\left[\int_{Y-W/2}^{Y+W/2} P(x,y)dx\right]dy};$$

```
FIND_FIRST_POINT();
{
    X = 0;
    Y = 0;
    DIRECTION = RIGHT;
    GO_NEXT(DIRECTION);
    FIND_MAX(X,Y);
    FIND_CENTER_OF_GRAVITY(X,Y);
    X1 =X;
    Y1 =Y;
}
```

FIG.10H

TEST_RESULTS(X,Y);
{
   SET FLAG TO NOT_VALID;
   FOR ALL THREE DIRECTIONS:
   {
      1) IF $(X < X_N)$ OR $(Y < Y_N)$ THEN TEST FAILS;

2) IF THE AVERAGE DISTANCE BETWEEN POINTS IS
         SIGNIFICANTLY DIFFERENT THEN THE DISTANCE
         OF (X,Y) TO $(X_N,Y_N)$ THEN TEST FAILS;

3) IF $ARCTAN((Y-Y_1)/(X-X_1))$ IS SIGNNIFICANTLY
         DIFFERENT THAN $ARCTAN((Y_N-Y_1)/(X_N-X_1))$ THAN
         TEST FAILS;

4) IF PASSED ALL THREE TESTS, SET FLAG TO VALID.
   }
   IF VALID THAN:
      COMPARE (X,Y) OF ALL VALID POINTS
      CHOOSE AS (X,Y) THE ONE CLOSEST TO $(X_N,Y_N)$;
}

FIG.10G

APPARATUS & METHOD FOR DESCREENING

FIELD OF THE INVENTION

The present invention relates to color reproduction systems generally and to reproduction systems for reproducing already rastered masters in particular.

BACKGROUND OF THE INVENTION

The art of printing typically includes rasterizing continuous tone master images, such as from transparencies, typically via half-toning. As is known in the art, half-toning is produced by superimposing a screen, having a known size, spatial frequency and angle, onto the continuous tone master image.

It is common to desire to reproduce the half-tone master on a reproduction system other than that used to produce it. For example, the half-tone master may have been produced for printing via an offset process and it is desired to reproduce it for printing via a gravure process. Alternatively, it may be desired to reproduce the half-tone master on a printing press with a different screen.

Since the screen used for the second printing method is typically different from the original screen, a Moire effect will arise if the original screen is not removed.

The process of removing the original screen before rescreening is known as descreening, or half-tone (HT) to continuous tone (CT) conversion, various elements of which are known in the art.

For example, descreening can be performed optically, as is described in U.S. Pat. Nos. 4,516,175 to Jung and 4,231,656 to Dickey et al. U.S. Pat. No. 4,516,175 describes an opto-electronic image scanning device with a scanning diaphragm having an aperture of variable size and shape for removing the original screen. The scanning spot produced by the aperture must be an integral multiple of the original screen size and the aperture must be aligned with the screen angle.

U.S. Pat. No. 4,231,656 utilizes an optical filter for removing the undesired screen frequency from a half-tone image and for modifying the amplitudes of the remaining frequencies in the frequency domain.

U.S. Pat. No. 4,403,258 to Balzan et al also performs optical descreening. The apparatus includes two or more concentric apertures which generate output signals according to the average tone variations scanned from the half-tone image in each of them. The signals are weighted electronically to produce the descreened image.

European Patent Publication 301,786 to Crosfield describes a digital filtering system for removing a screen from an half-tone image. The system includes apparatus for first scanning the half-tone image into a binary digital image, apparatus for averaging the binary image in order to reduce the number of pixels, and apparatus for descreening. The apparatus for descreening performs a Fast Fourier Transform (FFT) on a slice of the image, low pass filters the transformed image in the frequency domain, and finally, performs an Inverse FFT to obtain the descreened image. The method for descreening is described in detail in European Patent 195,563 also to Crosfield.

European Patent Publication 074,795 to Xerox describes an image scanning system which quickly scans a line and which determines whether or not to rescan the line slowly for processing by a half-tone processor. The half-tone processor is a digital filter and is preferably a low pass filter.

The following books and articles also discuss digital filtering and descreening type processes:

"A Survey of Electronic Techniques for Pictorial Image Reproduction", *IEE Transactions on Communications*, Vol. COM 29, No. 12, December 1981, pp. 1898–1925;

*Digital Image Processing*, Gonzalez, et al, Addison Wesley, 1977, pp. 218–233;

*Digital Signal Processing*, Oppenheim and Schafer, Prentice-Hall, 1975, pp. 239–250;

*Theory and Application of Digital Signal Processing*, Rabiner and Gold, Prentice Hall, 1975; and "On the Use of Windows for Harmonic Analysis with the Discrete Fourier Transform", Frederic J. Harris, *Proceedings of the IEEE*, Vol. 66, No. 1, Jan. 1978, pp. 51–84.

SUMMARY OF THE INVENTION

It is an object of the present invention to provide a method and apparatus for performing descreening and resolution changes in one operation.

It is a further object of the present invention to provide an "on-the-fly" method for correcting misregistration between color separations.

Additionally, it is an object of the present invention to provide a spatial domain measurement method of screen frequency and angle.

There is therefore provided, in accordance with an embodiment of the present invention, apparatus and method for descreening and for performing resolution changes on a half-tone image in order to produce a continuous tone image. The apparatus includes filter apparatus for removing screen information from the half-tone image including a plurality of different filters each providing interpolation and screen removal functions and a controller for selecting per pixel of the continuous tone image and as a function of desired resolution changes, one of the filters for operation on a neighborhood of the pixel.

There is further provided, in accordance with an embodiment of the present invention, apparatus and method for descreening and for performing resolution changes on a color printed image thereby to produce a color continuous tone image, the color printed image being separated into a plurality of input color separations and the continuous tone image being separated into output color separations. The apparatus includes filter apparatus for removing screen information from each of the input color separations, the filter apparatus including a plurality of different filters each providing interpolation and screen removal functions and a controller for selecting, per pixel of each of the output color separations and as a function of desired resolution changes, one of the filters for operation on a neighborhood of the pixel.

There is still further provided, in accordance with an embodiment of the present invention, apparatus and method for descreening and for performing correction of misregistration between at least two half-tone image separations in order to produce at least two continuous tone image separations. The apparatus includes apparatus for sensing the misregistration, filter apparatus for removing screen information from the half-tone image including a plurality of different filters each providing interpolation and screen removal functions and a controller for selecting, per pixel of each of the continuous tone image separations and in accordance with the sensed misregistration, one of the filters for operation on a neighborhood of the pixel.

There is additionally provided, in accordance with an embodiment of the present invention, apparatus and method for descreening and for performing resolution changes and correction of misregistration between at least two half-tone image separations in order to produce at least two continuous tone image separations. The apparatus includes apparatus for sensing the misregistration, filter apparatus for removing screen information from the half-tone image including a plurality of different filters each providing interpolation and screen removal functions and a controller for selecting, per pixel of each of the continuous tone image separations and in accordance with the sensed misregistration and as a function of desired resolution changes, one of the filters for operation on a neighborhood of the pixel.

Additionally, in accordance with an embodiment of the present invention, the interpolation functions are provided by a plurality of frequency domain phase shifts. The interpolation functions are alternatively provided by a plurality of sampled interpolation functions.

Moreover, in accordance with an embodiment of the present invention, the controller includes apparatus for performing resolution changes on each of the half-tone separations.

Further, in accordance with an embodiment of the present invention, each of the filters is applied in the spatial domain.

Still further, in accordance with an embodiment of the present invention, the screen removal functions are provided by screen removal filter apparatus for removing the entirety of frequencies at and above a predetermined frequency, wherein the frequency is a function of screen parameters. The screen removal functions are preferably provided by screen removal filter apparatus for removing a screen frequency and its harmonics. Alternatively, the screen removal functions are provided by screen removal filter apparatus for removing a screen frequency only.

Moreover, in accordance with an embodiment of the present invention, the printed image is produced from a plurality of half-tone image each having its respective screen frequency and wherein the screen removal functions are provided by circular screen removal filter apparatus for removing the entirety of frequencies at and above the respective screen frequencies.

Additionally, in accordance with an embodiment of the present invention, the filter apparatus are circular.

Further, in accordance with an embodiment of the present invention, the screen removal filter apparatus may be aligned with a predetermined screen angle.

Still further, in accordance with an embodiment of the present invention, the screen parameters are calculated on-the-fly and the screen removal functions are adjusted in accordance with the calculated screen parameters. The screen removal filter apparatus are low pass filters calculated according to a window method selected from the group of Hamming, Blackman, Dolph-Chebyshev or Blackman-Harris window methods.

Moreover, in accordance with an embodiment of the present invention, the controller includes apparatus for calculating the location of a next pixel in the continuous tone image, apparatus for choosing a location on a predefined grid closest to the location of the next pixel, the predefined grid being defined on the continuous tone image and apparatus for selecting one of the filters in accordance with the location on the predefined grid.

There is further provided, in accordance with an embodiment of the present invention, a method for descreening and for performing resolution changes on a half-tone image in order to produce a continuous tone image including the step of removing screen information from the half-tone image via a plurality of different filters each providing interpolation and screen removal functions. The step of removing includes the step of selecting, per pixel of the continuous tone image and as a function of desired resolution changes, one of the filters for operation on a neighborhood of the pixel.

There is further provided, in accordance with an embodiment of the present invention, a method for descreening and for performing resolution changes on a color printed image thereby to produce a color continuous tone image, the color printed image being separated into a plurality of color separations and the continuous tone image being separated into output color separations. The method includes the step of removing screen information from each of the color separations via a plurality of different filters each providing interpolation and screen removal functions. The step of removing includes the step of selecting, per pixel of each of the output color separations and as a function of desired resolution changes, one of the filters for operation on a neighborhood of the pixel.

There is still further provided, in accordance with an embodiment of the present invention, a method for descreening and for performing correction of misregistration between at least two half-tone image separations in order to produce at least two continuous tone image separations including the steps of sensing the misregistration and removing screen information from the half-tone image via a plurality of different filters each providing interpolation and screen removal functions. The step of removing includes the step of selecting, per pixel of each of the continuous tone image separations and in accordance with the sensed misregistration, one of the filters for operation on a neighborhood of the pixel.

Additionally, there is provided, in accordance with an embodiment of the present invention, a method for descreening and for performing resolution changes and correction of misregistration between at least two half-tone image separations in order to produce at least two continuous tone image separations including the steps of sensing the misregistration and removing screen information from the half-tone image via a plurality of different filters each providing interpolation and screen removal functions. The step of removing includes the step of selecting, per pixel of each of the continuous tone image separations and in accordance with the sensed misregistration and as a function of desired resolution changes, one of the filters for operation on a neighborhood of the pixel.

Additionally, in accordance with an embodiment of the present invention, the interpolation functions are provided by a plurality of frequency domain phase shifts. Alternatively, the interpolation functions are provided by a plurality of sampled interpolation functions.

Furthermore, in accordance with an embodiment of the present invention, the step of sensing misregistration includes the steps of prescanning at least one first portion of a first separation to provide a first digital representation, prescanning at least one second portion of a second separation to provide a second digital representation, the first and second portions being in the same location on the first and second separations, cross-correlating the first and second digital representations to provide a cross-correlation array, identifying a location of a maximum value of the cross-correlation array wherein the maximum value is a pixel-level maximum value and from the pixel-level maximum value and from cross-correlation values of its neighbors, estimating a location of a sub-pixel maximum value between the location of the pixel-level maximum value and locations of its neighbors.

Moreover, in accordance with an embodiment of the present invention, the step of removing screen information is performed in a spatial domain.

Additionally, in accordance with an embodiment of the present invention, the step of selecting includes the steps of calculating the location of a next pixel in the continuous tone image, choosing a location on a predefined grid closest to the location of the next pixel, the predefined grid being defined on the continuous tone image and selecting one of the filters in accordance with the location on the predefined grid.

There is further provided, in accordance with an embodiment of the present invention, a method of measuring screen frequency and angle of a screen grid pattern of a half-tone image, the grid pattern including dots. The method includes the steps of defining two non-consecutive dots of a line of the grid pattern and storing their coordinates, calculating the number of dots and the distance between the two non-consecutive dots thereby to calculate the screen frequency and calculating the angle from the coordinates of the non-consecutive dots.

Additionally, in accordance with an embodiment of the present invention, the step of defining includes the step of manually indicating the two non-consecutive dots. Alternatively, the step of defining includes the step of automatically identifying the two non-consecutive dots.

Moreover, in accordance with an embodiment of the present invention, the step of automatically identifying includes the steps of defining and storing coordinates of a first dot, finding and storing coordinates of a closest second dot which is in a predetermined quadrant of the image in relation to the first dot, redefining the second dot as a first dot and repeating the steps of finding and redefining to produce a plurality of dots defining a line.

Further, in accordance with an embodiment of the present invention, the steps of finding and repeating are performed recursively.

Still further, in accordance with an embodiment of the present invention, the step of finding includes the steps of moving from a center of the first dot until an intensity gradient becomes positive indicating an edge of the second dot, finding a maximum intensity value of the second dot, and finding a center of the second dot via a center of gravity calculation.

Finally, in accordance with an embodiment of the present invention, the method includes the step of testing that the second dot meets certain predetermined criteria.

BRIEF DESCRIPTION OF THE DRAWINGS

The present invention will be understood and appreciated from the following detailed description, taken in conjunction with the drawings in which:

FIGS. 10A, 10B, 10C, 10D, 10E, 10F, 10G and 10H form pseudocode useful in the method of FIG. 8;

DETAILED DESCRIPTION OF A PREFERRED EMBODIMENT

Figure 20:
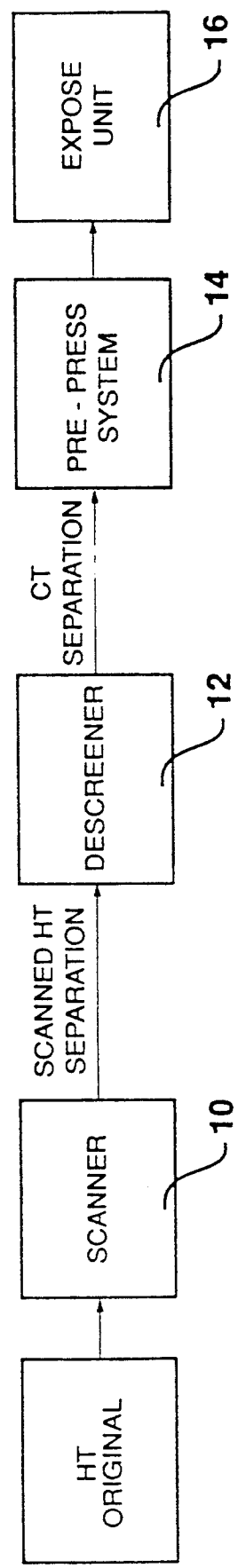
FIG. 20 is a block diagram illustration of a reproduction system utilizing descreening.

Reference is now made to FIG. 20 which illustrates, in block diagram form, a system for performing descreening. The system typically comprises a scanner 10, such as the Eskoscan 3540 Scanner manufactured by Eskofot of Copenhagen, Denmark, for producing a digital representation of a half-tone (HT) separation film useful for producing a color HT image. The resultant digital representation typically comprises a plurality of bits per pixel (sample).

As is known in the art, a color HT image is typically produced by printing a plurality of HT films each representing a different printable HT color separation.

The scanned HT separation is typically input to a descreener 12, described in more detail hereinbelow, for removing the screen information of the HT image, thereby to produce a Continuous Tone (CT) separation forming part of a CT image. The CT separation is subsequently input to a pre-press system 14, such as the Response System manufactured by Scitex Corporation Ltd. of Herzlia, Israel, for manipulating the CT separation and for preparing it for reproduction by an expose unit 16. A typical expose unit 16 might be a plotter which exposes films from which offset printing plates are made or a helioklishograf which produces cylinders for gravure printing or any other suitable exposing device. Typically, the pre-press system 14 is operative to define a new screen to be superimposed upon the CT separation upon reproduction by the expose unit 16.

In accordance with a preferred embodiment of the present invention, descreener 12 of the present invention is operative to perform changes in resolution, whether enlargements or reductions, as well as on-the-fly corrections for misregistrations between the input color separations of the HT image, in addition to removing the screen information. The term "on-the-fly" indicates that the misregistration corrections are performed in conjunction with the descreening operations rather than preparatory to or following them.

Figure 1:
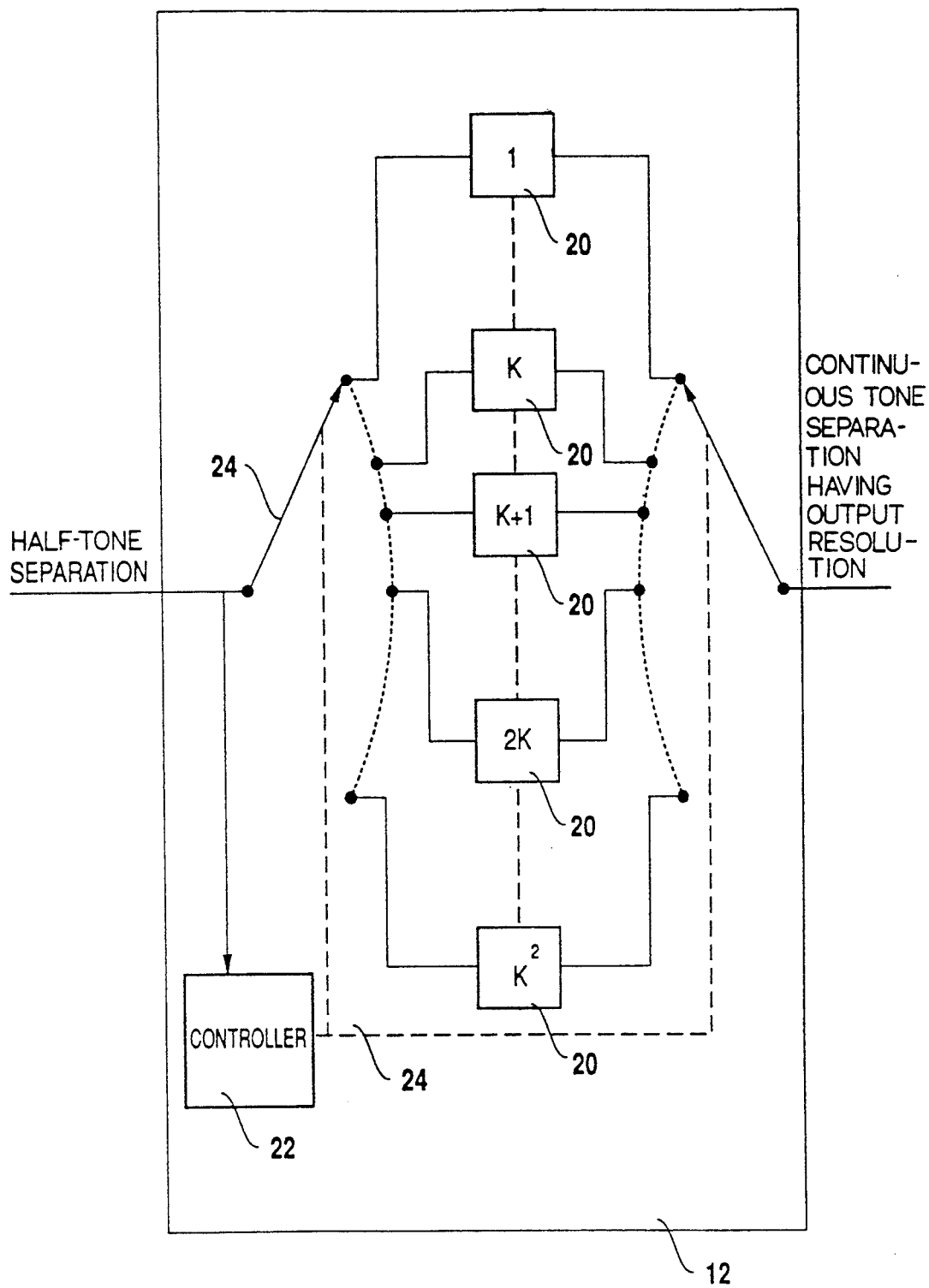
FIG. 1 is a block diagram illustration of descreening apparatus constructed and operative in accordance with a preferred embodiment of the present invention.

Reference is now made to FIG. 1 which illustrates a descreener 12 constructed and operative in accordance with the present invention. The descreener 12 typically comprises a plurality of screen removal filters 20, described in more detail hereinbelow, for removing the screen information from an input HT separation and a controller 22 for choosing the appropriate screen removal filter 20. Each screen removal filter 20 operates on a given neighborhood in the HT separation and produces an output pixel of the CT separation. The choice of a filter 20 is based on the location of the output pixel of the CT image, as described in more detail hereinbelow. Controller 22 typically operates a switch 24 to switch among the plurality of filters 20.

Figure 2A:
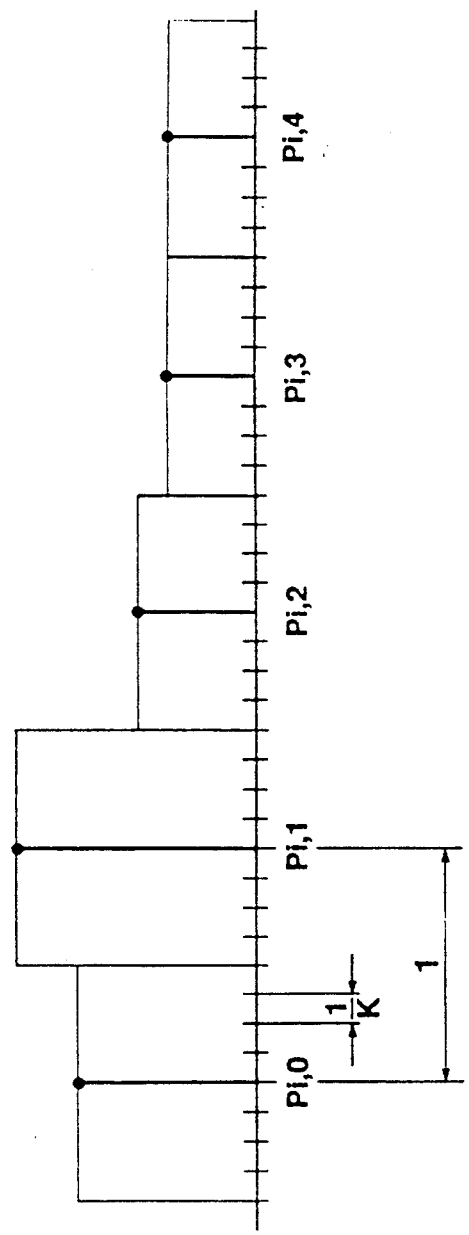
FIG. 2A is a pictorial illustration of a subdivided row of a separation of an image useful in understanding the apparatus of FIG. 1.
Figure 2B:
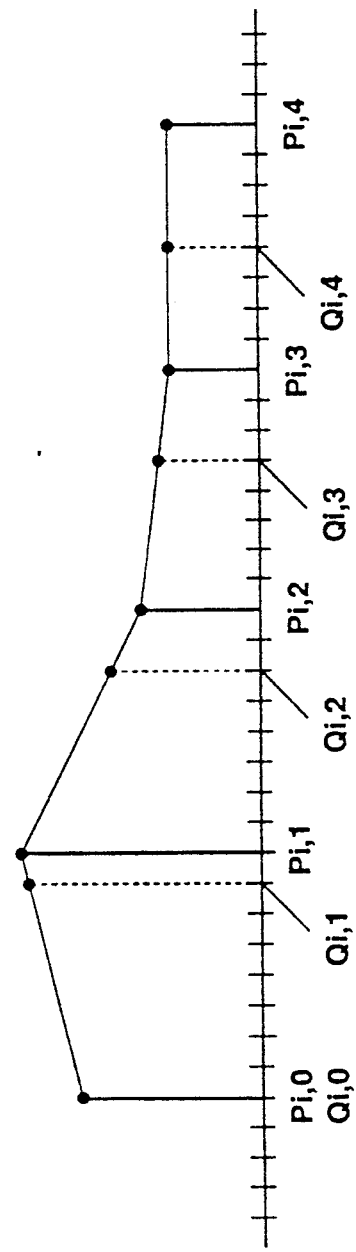
FIG. 2B is a pictorial illustration of resolution changes on the subdivided row of FIG. 2A.
Figure 3:
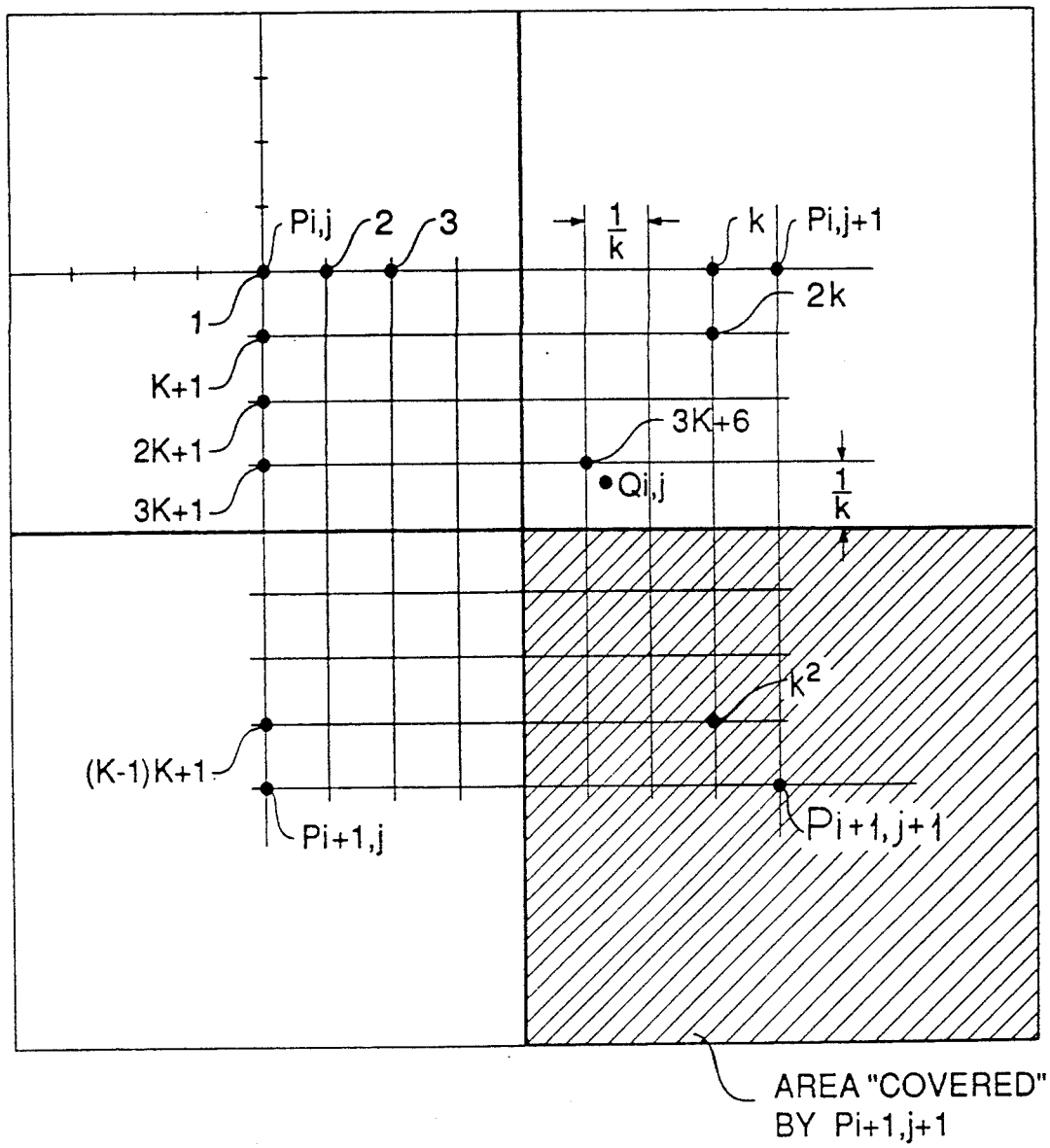
FIG. 3 is a pictorial illustration of a portion of a subdivided separation useful in understanding the apparatus of FIG. 1.

As is known in the art, a desired new resolution for a new image or separation is not necessarily an integral multiple of the initial resolution of the input image or separation. In non-integral resolution changes, pixel locations in the new image typically fall between pixel locations of the input image. This is illustrated in FIGS. 2A, 2B and 3 to which reference is now briefly made. FIG. 2A illustrates a row of the input image where a typical image is two dimensional having rows and columns and FIG. 3 illustrates subdivisions between adjacent pixels in the input image.

The $P_{i,j}$ are the pixels of the input HT separation and the $Q_{i,j}$ are pixels of the CT separation at a new resolution, where $P_{i,0}$ and $Q_{i,0}$ are at the same pixel location. FIG. 2A indicates that the HT separation is subdivided such that there are K possible pixel locations per pixel $P_{i,j}$ in a row and the size of the subdivisions is $1/K$ of a pixel. As shown in FIG. 3, there are also K possible pixels between rows. K is predetermined and is typically equal to 8. FIG. 2B illustrates the resolution change operation.

To produce the $Q_{i,j}$ of FIG. 2B, the following shifts of the $P_{i,j}$ must occur: $P_{i,0}$ requires no shift to produce $Q_{i,0}$, $P_{i,1}$ requires a one unit shift to the left to produce $Q_{i,1}$, where the size of the unit is $1/K$ of a pixel, $Q_{i,2}$ requires a two unit shift to the left from $P_{i,2}$ or a six unit shift to the right from $P_{i,1}$, etc. In addition, the values of the output pixels $Q_{i,j}$ are interpolated versions of the values of the input pixels $P_{i,j}$, as can be seen in FIG. 2B.

As is known in the art, non-integral resolution changes are performed via interpolation of the input separation. FIGS. 4A–4D, to which reference is now briefly made, illustrate the interpolation operation for a one-dimensional discrete filter $h(n)$. Adaptation to a two-dimensional filter is simple and straightforward. In each figure, the abscissa is the position in the series, n, and the ordinate is the value of the nth point, $h(n)$.

Figure 4A:
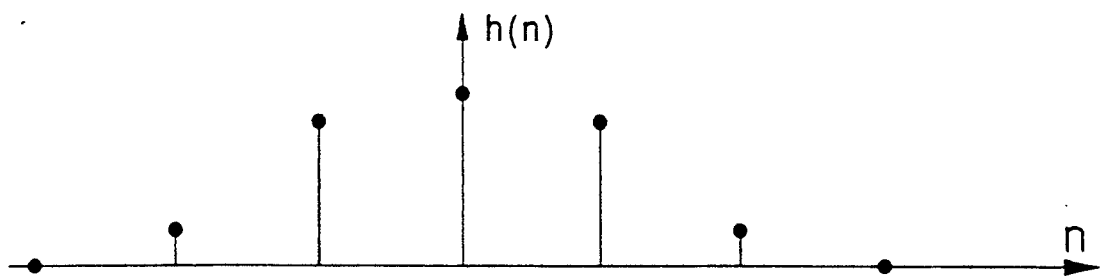
FIGS. 4A, 4B, 4C and 4D are graphical illustrations of a method of interpolation useful in understanding the apparatus of FIG. 1.
Figure 4B:
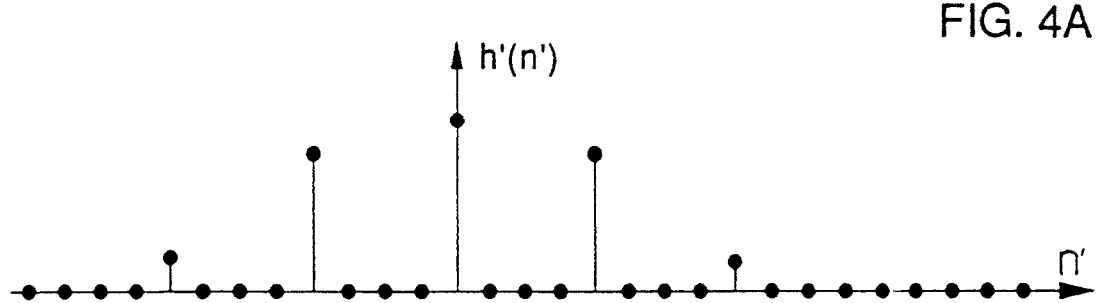

As is known in the art, interpolation of filter $h(n)$ is performed by first adding $K-1$ zero valued points between each element in $h(n)$. FIG. 4A illustrates the input filter $h(n)$ and FIG. 4B illustrates the resultant filter $h'(n')$ for $K=4$. It will be appreciated that $h(n) = h'(n' = n*K)$.

Figure 4C:
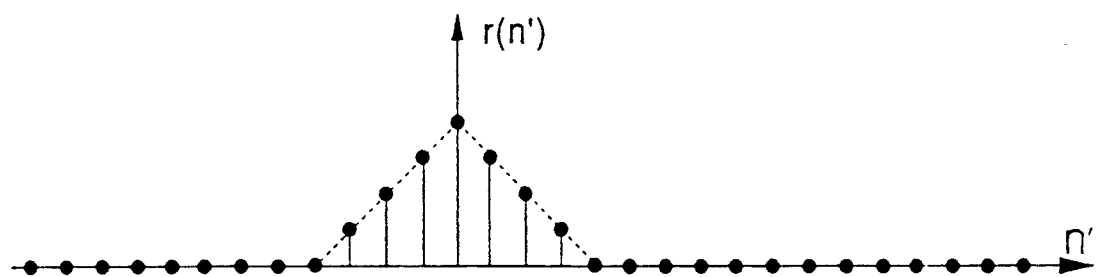
Figure 4D:
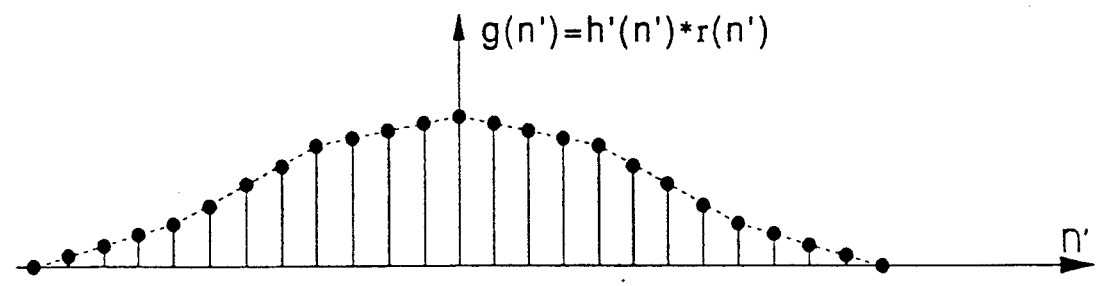

Resultant filter $h'(n')$ is then filtered by an interpolation filter which can be represented by a discrete series $r(n')$. An example series $r(n')$ for performing linear interpolation is shown in FIG. 4C and the output filter $g(n')$ which is the result of the convolution of $h'(n')$ with $r(n')$ is shown in FIG. 4D.

The output filter $g(n')$ is an interpolated version of $h(n)$. Filtering a signal with $g(n')$ is equivalent to filtering the signal with $h(n)$ and then interpolating the result with $r(n')$.

The entirety of elements of the interpolation filter $r(n')$ are not necessary to produce each element of $g(n')$. Due to the additional zero valued elements, typically only $1/K$ of the elements of the series $r(n')$ contribute to an element of $g(n')$. Thus, if it is desired to produce only some of the elements of $g(n')$, it is advantageous and computationally less expensive to utilize only those elements of the interpolation filter $r(n')$ which contribute to produce the desired elements of $g(n')$.

To that end, it is advantageous to represent interpolation filter $r(n')$ as a combination of K filters $r_\delta(n)$ where $\delta$ is equal to $M/K$ and where M varies from 0 to $K-1$. Each filter $r_\delta(n)$ calculates only those elements of $g(n')$ at the locations $n' = n*K + M$. The combination of the outputs of each filter $r_\delta$, shifted according to the appropriate M, is the series $g(n')$.

Therefore, in order to provide a descreener 12 with the capability to perform resolution changes on an image generally efficiently, there are provided, in accordance with a preferred embodiment of the present invention, $K^2$ screen removal filters 20, denoted $g_{\delta x \delta y}(n_x, n_y)$, each of which includes a screen removal portion and an interpolation portion. The screen removal portion is a two-dimensional filter $h(n_x, n_y)$, typically a Low Pass Filter, and the interpolation portion is one of $K^2$ possible interpolation filters $r_{\delta x \delta y}(n_x, n_y)$, as described in more detail hereinbelow. As mentioned hereinabove, the choice of a screen removal filter 20 depends on the location of the output pixel.

It will be noted that x and y are the two orthogonal directions of the image and $\delta x$ and $\delta y$ are the size of the shift in the x and y directions.

In accordance with one embodiment of the present invention, $r_{\delta x \delta y}(n_x,n_y)$ is any suitable standard interpolation filter, such as a linear or a cubic spline filter.

In accordance with a preferred embodiment of the present invention, the interpolation portion of filter $g_{\delta x \delta y}(n_x,n_y)$ can be simulated by selected phase shifting, in the frequency domain, of the Discrete Fourier Transform of the screen removal filter $h(n_x,n_y)$. The Discrete Fourier Transform is denoted $H(w_x,w_y)$. To do so, the Discrete Fourier Transform $H(w_x,w_y)$ is multiplied by a two dimensional frequency domain phase shift factor $e^{-j(2\pi/N)(w_x\delta x + w_y\delta y)}$, where N is the number of points in the filter, thereby producing the Discrete Fourier Transform $G_{\delta x \delta y}(w_x,w_y)$ of the screen removal filter.

An inverse Discrete Fourier Transform is performed on $G_{\delta x \delta y}(w_x,w_y)$, thereby producing a screen removal filter 20 $g_{\delta x \delta y}(n_x,n_y)$ which has an approximately similar frequency response to that of screen removal portion $h(n_x,n_y)$ and which is shifted by $\delta x$ in the x direction and $\delta y$ in the y direction. In order to ensure that $g_{\delta x \delta y}(n_x,n_y)$ has only real components (as opposed to complex components), $H(w_x,w_y)$ should be zero at the frequencies $\pm \pi/2$.

The preferred interpolation method described hereinabove is advantageous in the following ways, where, for the purposes of the following comparison only, the screen removal filter with the standard interpolation filter is denoted $g_{\delta x \delta y}(n_x,n_y)$ and the screen removal filter with the phase shifting is denoted $g'_{\delta x \delta y}(n_x,n_y)$.

1) The filters $g'_{\delta x \delta y}(n_x,n_y)$ have approximately the same frequency response as the screen removal filter $h(n_x,n_y)$ and exactly the same frequency response at the frequencies $(2\pi/N)i$ in the x direction and $(2\pi/N)j$ in the y direction where i and j vary between 0 and $N-1$. The filters $g_{\delta x \delta y}(n_x,n_y)$, on the other hand, have different frequency responses for each $\delta x,\delta y$ combination due to the convolution of $h(n_x,n_y)$ with different interpolation filters $r_{\delta x \delta y}(n_x,n_y)$ each having a different frequency response.

2) The screen removal filter $g'_{\delta x \delta y}(n_x,n_y)$ has the same number of elements as the screen removal filter $h(n_x,n_y)$ whereas $g_{\delta x \delta y}(n_x,n_y)$ is larger by one less than the size of $r_{\delta x \delta y}(n_x,n_y)$.

Reference is now made back to FIGS. 1 and 3. The first filter 20, marked 1 in FIG. 1, typically has no phase shift and the first K filters 20, marked 1 through K in FIG. 1, typically have a zero phase shift in a first spatial direction, such as the y direction, and an increasing phase shift in a second spatial direction, such as the x direction. The locations corresponding to each filter 20 are marked on FIG. 3.

The second K filters 20, marked K+1 to 2K in FIG. 1, typically have a one unit phase shift in the first spatial direction and an increasing phase shift in the second spatial direction, where the increase is typically in increments of one unit and one unit is 1/K of an input pixel. As mentioned hereinabove, there are typically $K^2$ filters 20.

In accordance with the present invention, any size resolution change can be effected as follows. The location (x,y) of a next output pixel in the new CT separation is calculated from the location (x_prev, y_prev) of a previous pixel in the new CT separation as follows:

$$x = x\_prev + x\_step \quad (1)$$

$$y = y\_prev + y\_step \quad (2)$$

where x_step and y_step are functions of the input resolutions in the x and y directions (x_input_res and y_input_res), the output resolutions in the x and y directions ( x_output_res and y_output_res ) and the enlargement in both directions (x_enl and y_enl) as follows:

$$x\_step = x\_input\_res/(x\_output\_res * x\_enl) \quad (3)$$

$$y\_step = y\_input\_res/(y\_output\_res * y\_enl) \quad (4)$$

Typically, the pixel locations of the new CT separation are calculated by first calculating the y value for an entire row of the separation and then moving down the row, continually increasing the x values. A new y value is calculated upon completion of the row.

The filter 20 to be used to remove the screen information for a pixel $Q_{i,j}$ at a location (x,y) of the CT separation is chosen as the filter 20 corresponding to the location closest to (x,y). For pixel $Q_{i,j}$ shown in FIG. 3, the filter 20 marked 3K+6 is chosen.

To choose the proper filter 20, the x and y values of the location of $Q_{i,j}$ are rounded, mod(1/K) In this manner, the error in the location of each $Q_{i,j}$ is no more than $\frac{1}{2}$K. The integer portion of the x and y values define the pixel around which the chosen filter will operate and the rounded fractions of x and y define the amount of the shift, $\delta x$ and $\delta y$.

For each $Q_{i,j}$, the controller 22 calculates the (x,y) value and from the (x,y) value, chooses the appropriate filter 20 to which it then connects the input HT separation.

It will be appreciated that the present invention can easily correct for misregistrations between color separations in the HT image. For the first color separation processed, no correction is performed. For the remaining separations, the misregistration between the first separation and the current separation is measured before processing the separation, as described hereinbelow, and a correction is defined.

For example, assuming that the misregistration for a given separation comprises only a translation and that the translation is measured as $(X_0, Y_0)$, then the initial x and y locations used for the calculations of the continuous tone separation are $(X_0, Y_0)$ and no other correction is necessary.

If the misregistration comprises a rotation as well as a translation, then the initial x and y locations used for the calculations of the CT separation are, as above, $(X_0, Y_0)$. This corrects for the translation error.

Figure 5:
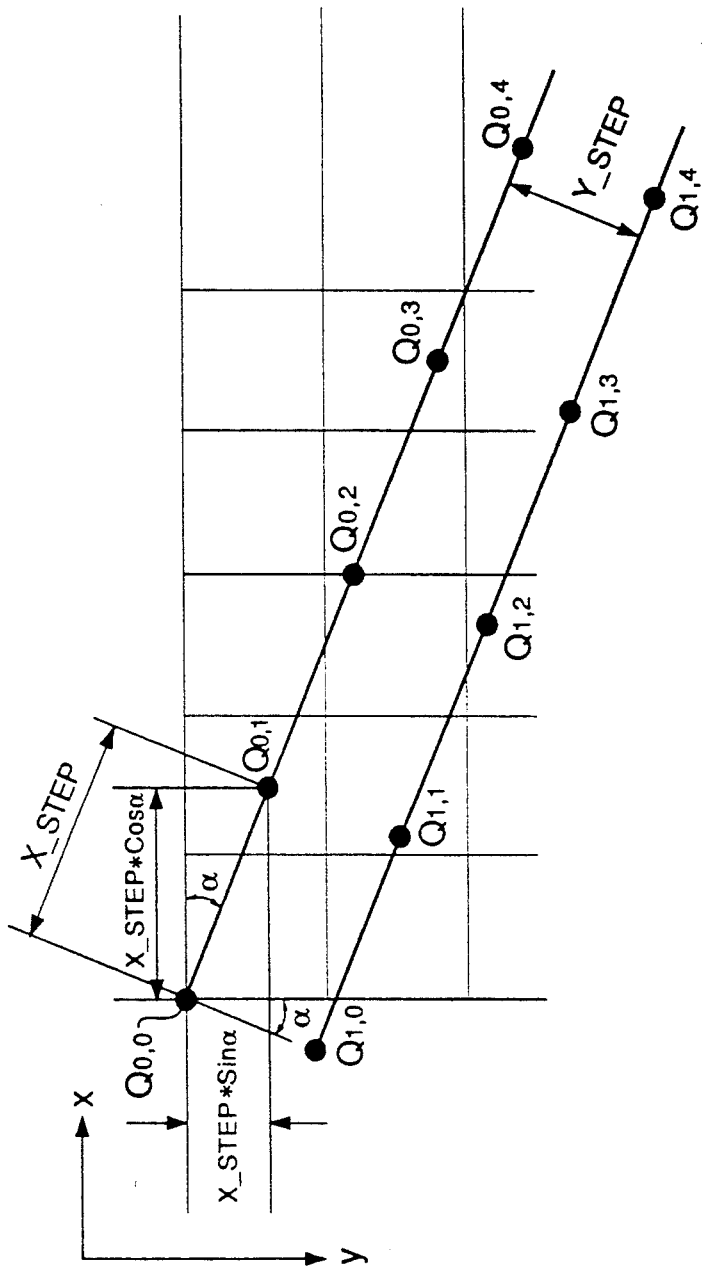
FIG. 5 is an illustration of a separation with an angular misregistration, useful in understanding the operation of the apparatus of FIG. 1.

An angular misregistration of size $\alpha$ and in the clockwise direction is shown in FIG. 5, to which reference is now briefly made. The distance between pixels along x and y directions rotated by $\alpha$ are x_step and y_step, as above. The misregistration is corrected for each pixel in a row as follows:

$$x = x\_prev + x\_step * \cos\alpha \quad (5)$$

$$y = y\_prev + x\_step * \sin\alpha \quad (6)$$

At the end of each row, the starting coordinates x_first, y_first of the new row are calculated from the previous starting coordinates x_first_prev, y_first_prev as follows:

$$x\_first = x\_first\_prev - y\_step * \sin\alpha \quad (7)$$

$$y\_first = y\_first\_prev + y\_step * \cos\alpha \quad (8)$$

It will be appreciated that, in accordance with the present invention, any measurable misregistration function can be corrected.

In accordance with the present invention, the screen removal portion $h(n_x,n_y)$ of filter 20 can be any known filter which attenuates the predetermined screen frequency. It is typically a circular filter so as to accommodate all possible screen angles. A method for determining the screen frequency and angle is described hereinbelow with respect to FIG. 9.

The screen removal filter might be a circular Low Pass Filter (LPF) for passing all frequencies below the screen frequency Such a filter might be calculated in accordance with any one of the following window methods: Hamming, Blackman, Dolph-Chebyshev or Blackman-Harris. These window methods are described in detail in the books and articles discussed in the Background of the Invention, all of which are incorporated herein by reference Alternatively, the screen removal filter $h(n_x,n_y)$ might be an averaging filter, such as described hereinbelow with respect to FIG. 6.

Figure 6:
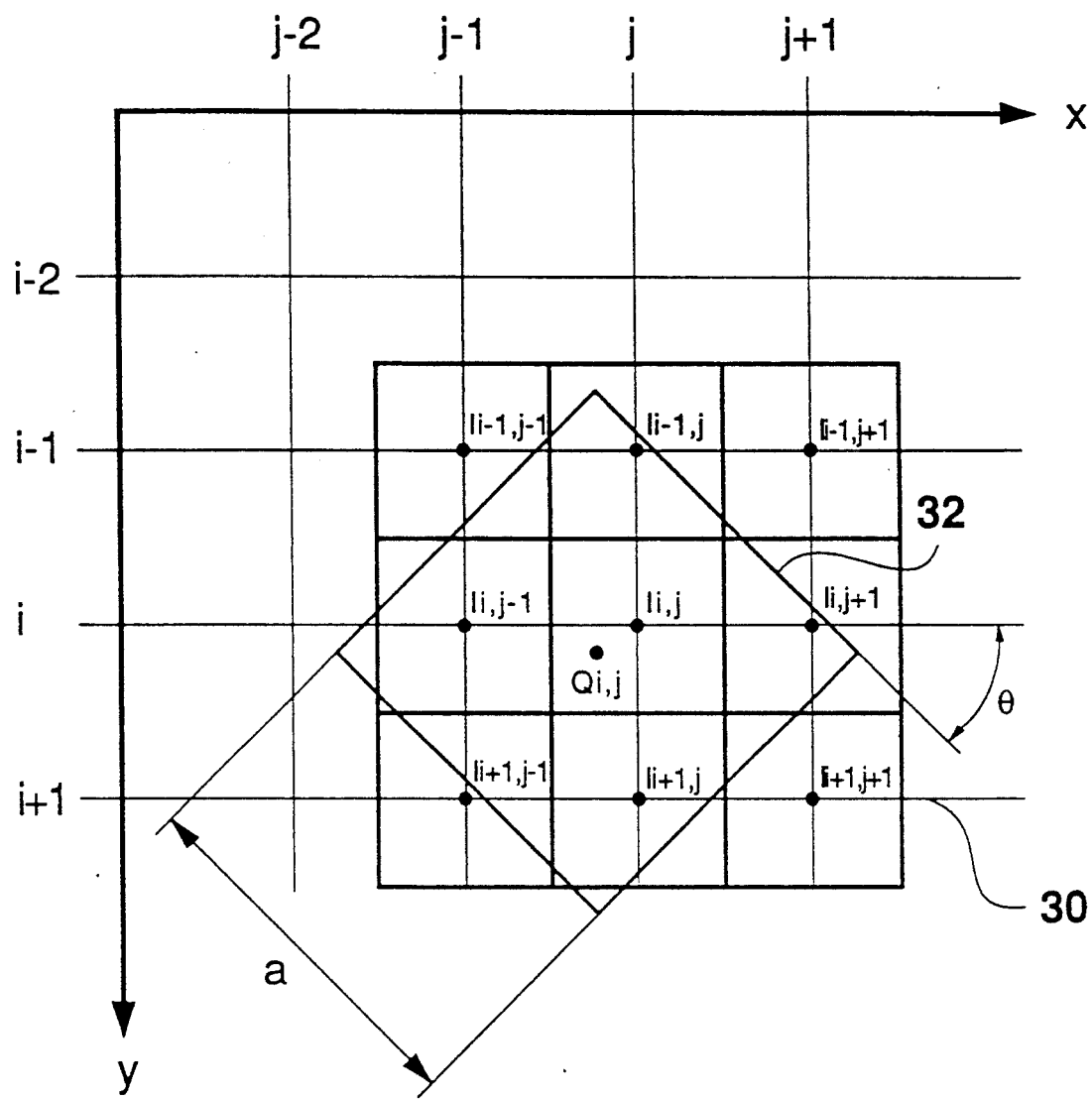
FIG. 6 is a pictorial illustration of a rotated square mask on a background of a square grid of pixels useful in understanding the filtering operation of the apparatus of FIG. 1.

Reference is now made to FIG. 6 which illustrates an averaging filter. A background grid 30 is a grid of pixels of the HT separation where each pixel $P_{i,j}$ has an intensity $I_{i,j}$. A square screen cell 32 is marked at a known angle $\theta$ to background grid 30. The side of cell 32 is marked a, where a is defined as follows:

$$a = input\_res/screen\_ruling \qquad (9)$$

where input_res is the resolution of the HT image and screen_ruling is the measured screen spatial frequency and 'a' is defined in units of input pixels.

The value of the intensity of the output pixel $Q_{i,j}$ is defined as the weighted sum of the intensities $I_{i,j}$. Specifically, each input pixel $P_{i,j}$ lying beneath the screen cell 32 is summed, weighted by a portion s of the pixel lying beneath the screen cell 32. A pixel which is entirely within the cell 32 has a weight of $1/a^2$ and a pixel only partly within cell 32 has a weight of $s/a^2$.

Screen cell 32 is defined with $Q_{i,j}$ at its center. Thus, each screen removal filter 20 (FIG. 1) places the screen cell 32 in a different position with respect to the background grid 30.

It will be appreciated that the first pixel in the image is the pixel for whom an entire neighborhood is available, where the neighborhood is defined by the size of the filter 20. If the screen removal part of filter 20 is a LPF with a M×M kernel, then the first pixel is the one for whom a full kernel is defined. If, the screen removal part of filter 20 is an averaging filter such as shown in FIG. 6, then the first pixel is one for whom cell 32 lies fully on background grid 30.

It will be further appreciated that, in accordance with standard image processing techniques, the output CT separation is produced by "sliding" the cell 32 over the HT separation in a column-by-column and row-by-row fashion where the location of the center of the cell is the location of the output pixel of the CT separation, rounded mod (1/K).

For some HT separations, the screen parameters change in the middle of the image. For such HT separations, the screen parameters can be measured on-the-fly and the screen removal filter 20 can be updated with the newly measured parameters. The updating need only be performed when a detected screen parameter change is maintained over a number of pixels since the Moire effects which occur as a result of filtering with incorrect screen parameters are relatively large scale effects.

Typically, screen removal filter 20 is applied in the spatial domain since operation in the spatial domain utilizes less memory than operation in the frequency domain. Specifically, operation in the spatial domain requires storage of the number of rows M in the neighborhood of the filter; operation in the frequency domain requires storage of the number of rows N in the image due to the necessity of performing a Fast Fourier Transform (FFT) on large portions of the image.

The spatial domain descreening and resolution changing application described hereinabove typically requires $N^2M^2/L^2$ computations where L is the factor of a resolution reduction change and typically is between 2 and 3. Performing descreening and resolution changes in the frequency domain typically utilizes $4N^2$ 1 g(N) computations. For M less than 12 and 1 g(N) of 8 or 9, as is common, the spatial domain method requires less computations than the frequency domain method. It will be noted that due to aliasing effects, it is not possible to first reduce the resolution and then perform descreening. Rather, the descreening must either occur first or in conjunction with the resolution change. Alternatively an anti-aliasing filter function may be provided. In such a case, partial reduction of resolution may be achieved by the anti-aliasing filter. The anti-aliasing filter may be realized optically as by defocussing the scanner 20 or alternatively electronically by providing digital filtering of the output of the scanner. Such digital filtering can be achieved by the use of two one-dimensional digital filters.

It is appreciated that if the sampling rate of the scanner is sufficiently high with respect to the screen frequency, anti-aliasing is not required.

It is further appreciated that whereas the descreener 12 serves also to accomodate changes in resolution and misregistration, enhanced operational speed of descreener 12 may be realized by shifting the resolution changing and misregistration accomodation functions to an anti-aliasing filter. In such an embodiment, descreener 12 would employ a single descreening filter, while the anti-aliasing filter would employ k filters for each single dimension and $k^2$ filters in case of a two-dimensional anti-aliasing filter. The resolution of the image in the input of the anti-aliasing filter is typically 6 to 16 times the screen frequency. The anti-aliasing filter is followed by sub sampling apparatus which reduces the resolution of the image in the input of the descreener to typically 3 to 8 times the screen frequency. The sub sampling can be carried out in conjunction with the anti-aliasing filtering as is described above for the descreening.

Figure 7:
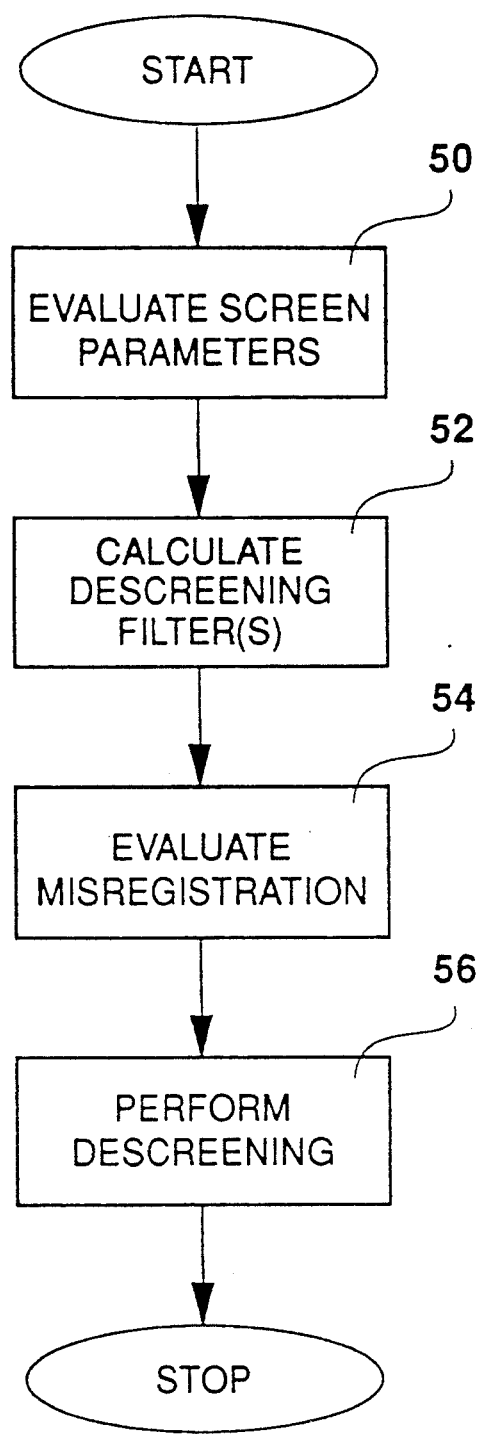
FIG. 7 is a flow chart illustration describing the operation of a controller of the apparatus of FIG. 1.

Reference is now made to FIG. 7 which illustrates, in flow chart form, the general operation of the descreener 12 of the present invention on each separation. Descreener 12 first evaluates, in step 50, the screen parameters, such as frequency and angle, in the HT image. The parameters can be measured by the operator via any suitable means and input into the descreener 12 via input means (not shown) or they can be automatically or semi-automatically measured as described hereinbelow with respect to FIGS. 8 and 9.

The screen parameters thus evaluated are then utilized, in step 52, to produce the plurality of screen removal filters 20. For each separation, the misregistration is evaluated in step 54 via a procedure outlined in FIG. 14.

It will be appreciated that for the first separation, a prescan is performed to determine the placement of the first separation and the measured coordinates are stored for reference. No correction is performed.

Descreening, optional resolution changing and misregistration correction for a current separation which is not the first, are then performed on the separation, as noted in step 56. The operation is performed as described hereinabove with respect to FIGS. 1–4.

Figure 8:
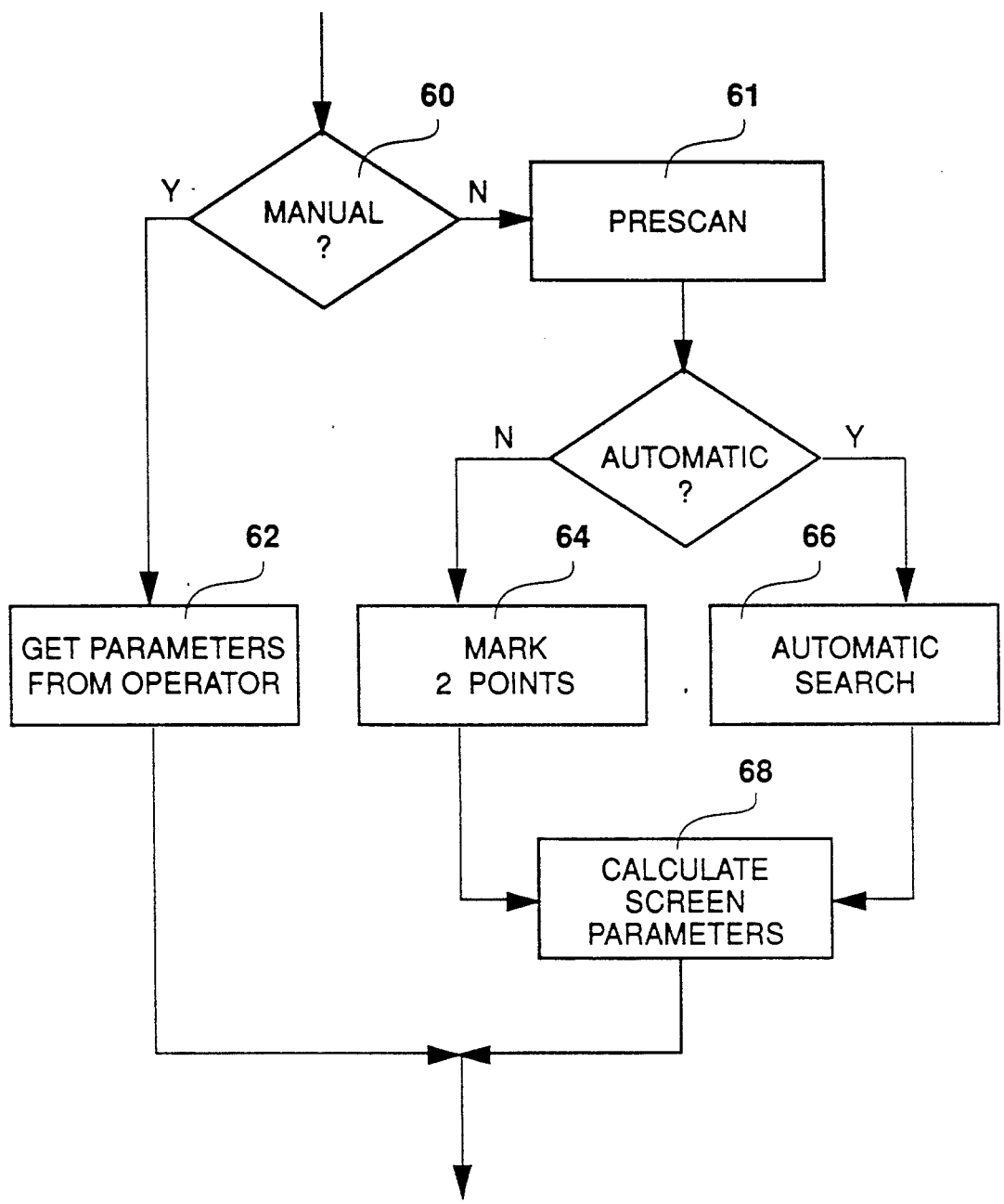
FIG. 8 is a partial flow chart illustration of a method of evaluating screen parameters forming part of the flow chart of FIG. 7.

Reference is now made to FIG. 8 which illustrates the steps involved in performing step 50 of FIG. 7, evaluating screen parameters. The evaluation typically requires that the descreener 12 include graphics editing and displaying capabilities, such as those found in the Softproof Workstation manufactured by Scitex Corporation Ltd.

In step 60, the operator is asked if he wishes to perform manual calculation of the screen parameters. If so, the descreener 12 continues to step 62, requests that the operator input the screen parameters and then continues to step 52 of FIG. 7.

If the operator desires semi- or fully-automatic calculation of the screen parameters, the descreener 12 performs, in step 61, a prescan of a generally small portion of the current separation.

Figure 9:
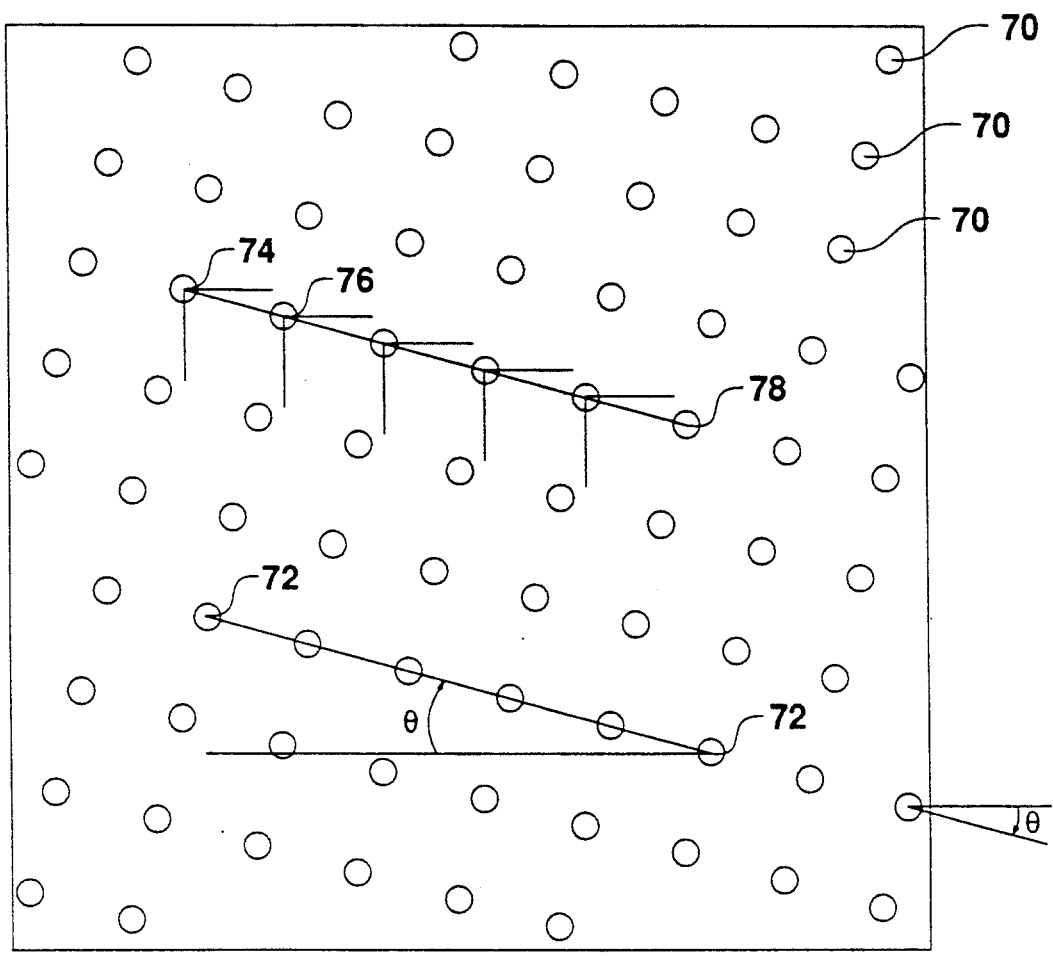
FIG. 9 is a pictorial illustration of a screened separation useful in determining screen parameters.
Figure 11:
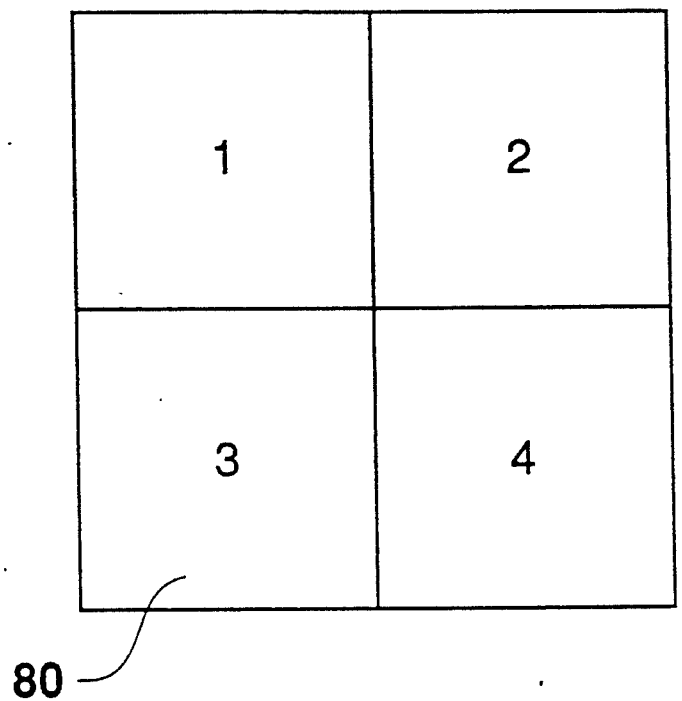
FIG. 11 is a pictorial illustration of a window useful in understanding the operation of the pseudocode of FIG. 10D.
Figure 12A:
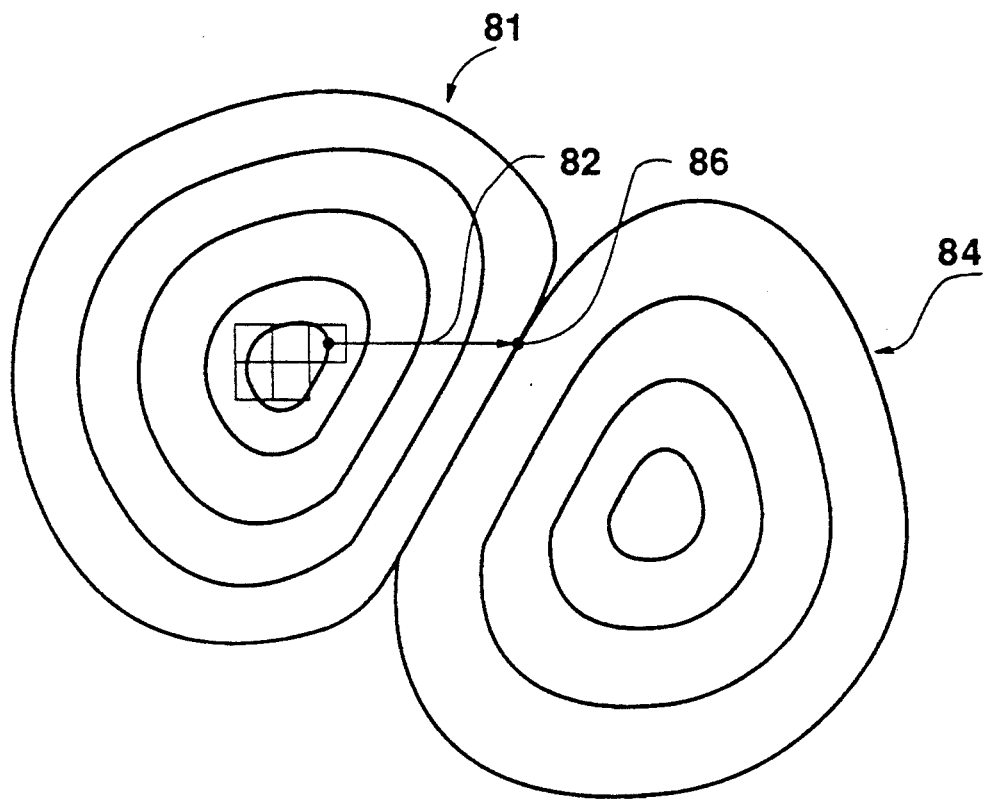
FIGS. 12A, 12B and 12C are pictorial illustrations of the operations of the pseudocodes of FIGS. 10C, 10D and 10E, respectively.
Figure 12B:
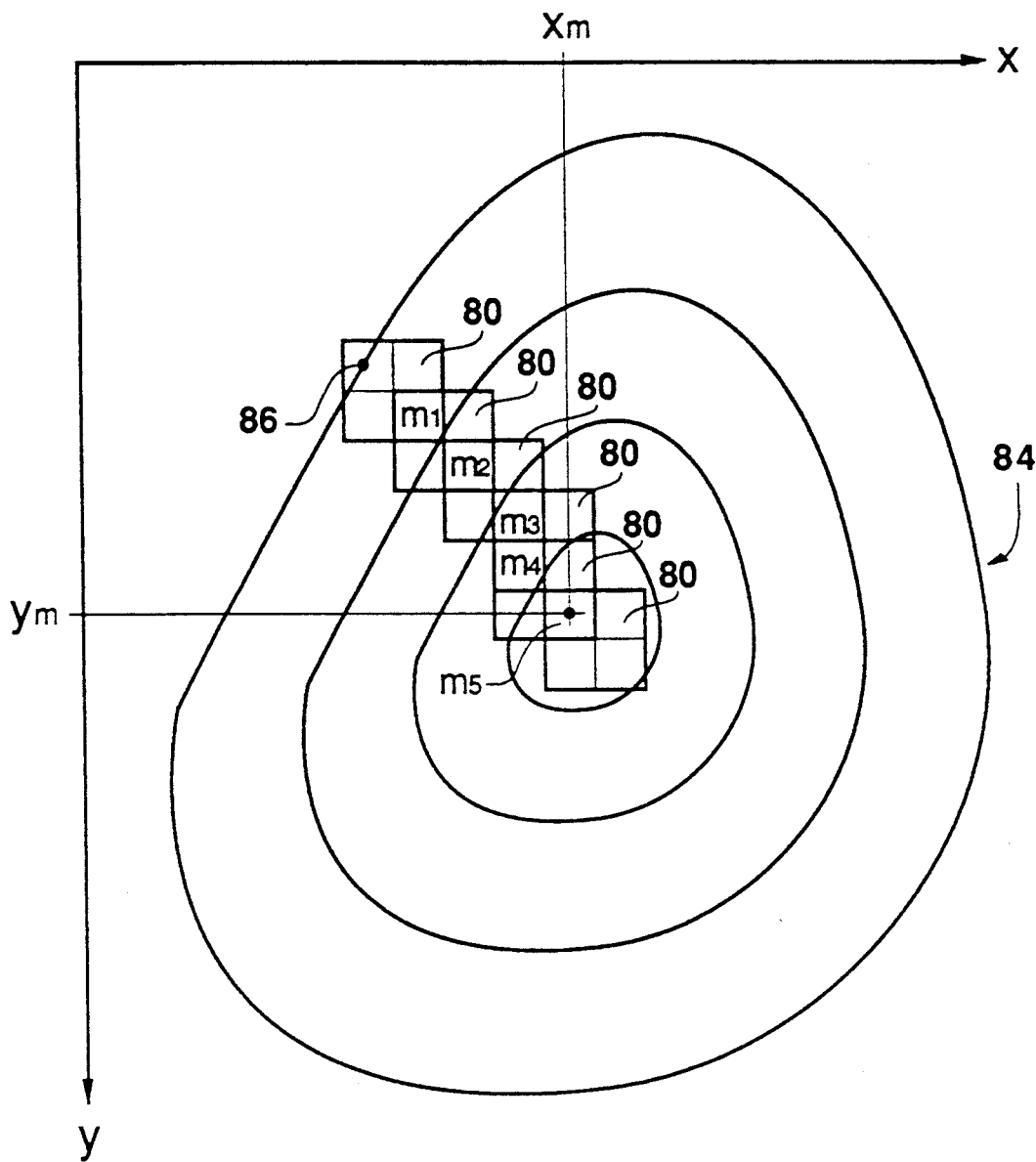
Figure 12C:
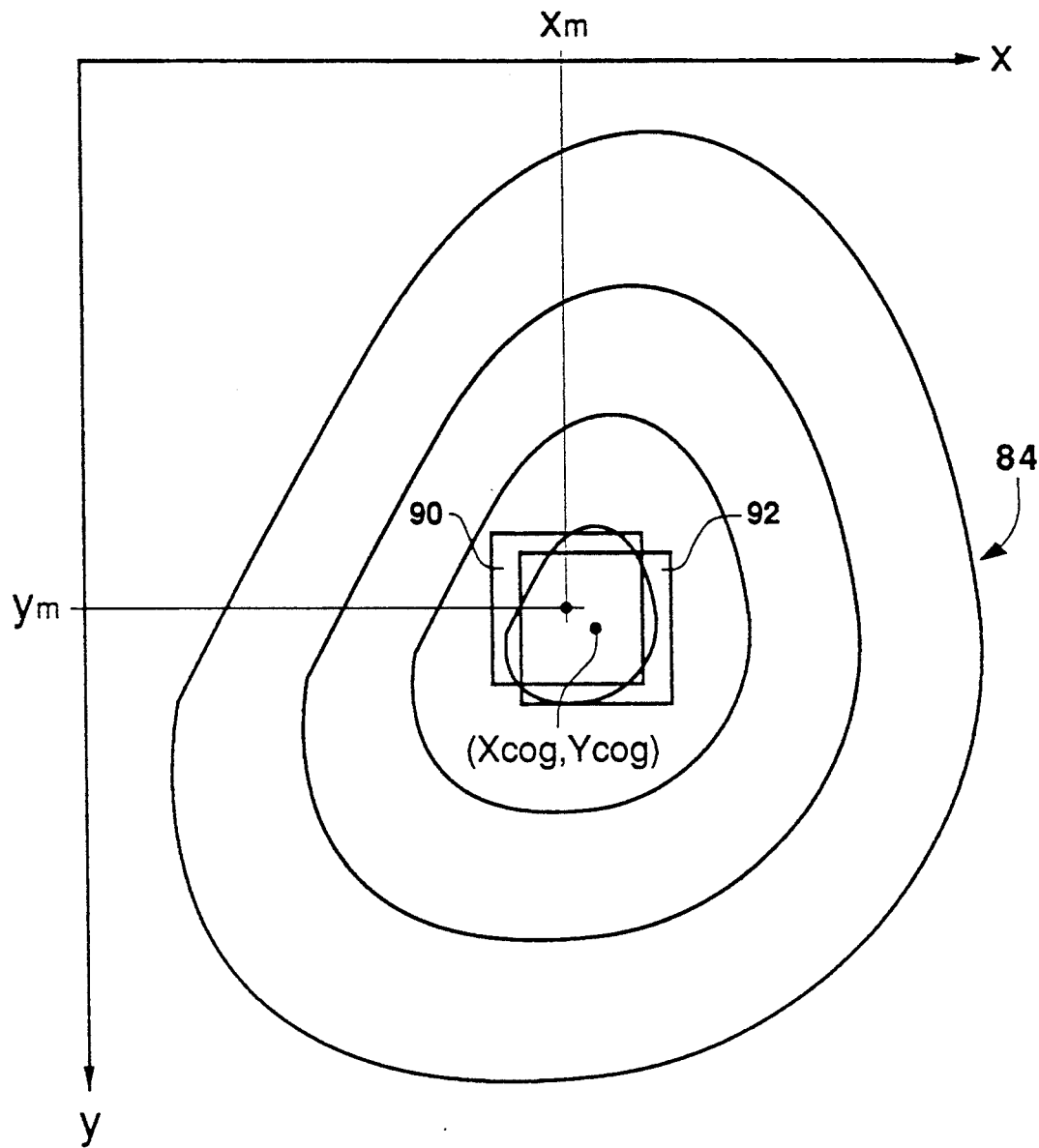
Figure 13:
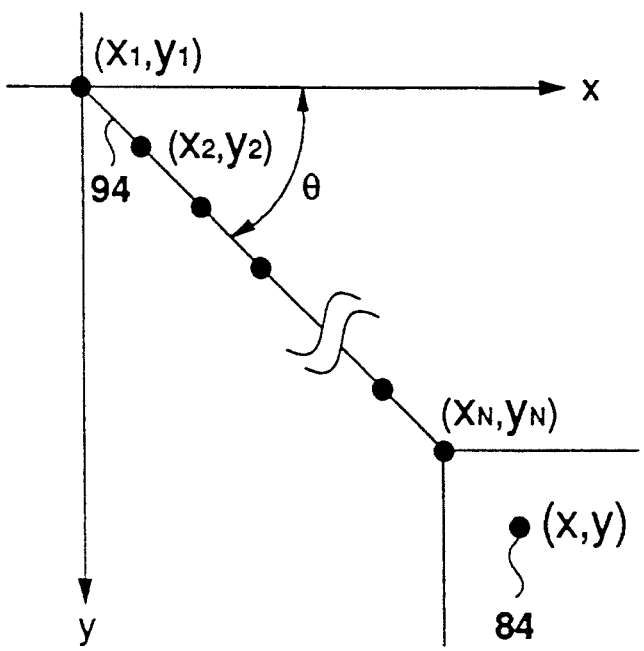
FIG. 13 is a pictorial illustration of a line of points, useful in understanding the operations of the pseudocode of FIG. 10G.

If the operator chooses semi-automatic calculation, the descreener 12 proceeds to step 64 and displays a portion of the HT image on a monitor (not shown) forming part of the descreener 12. An example of an HT image is shown in FIG. 9. The HT image has a plurality of screen dots 70 at a given frequency and at a given angle $\theta$ to the horizontal. Thus, the HT image has a plurality of lines at angle $\theta$.

The descreener 12 requests, in step 64, that the operator mark two points 72, more than a few dots 70 apart, which fall on the same line. The marking is typically performed with input apparatus (not shown), such as a mouse, and results in the storage of the locations of the two points. Since two points define a line, the angle $\theta$ of the screen can be calculated, in step 68, from the known positions of the two dots 72.

The screen frequency is calculated from the locations of the two points and the number of points between them. Typically, the number of points is measured as follows: a portion of the image including the two marked points is filtered with a thresholding filter, thereby producing a binary image. Descreener 12 "travels" from the position of the first point, in the direction $\theta$, towards the location of the second point, counting the crossings between binary values. Every two crossings constitutes a dot. The screen frequency is the number of dots divided by the distance between the dots.

If the operator desires automatic calculation of the screen parameters, the descreener 12 does so using the data acquired in the prescan of step 61. A screen mesh and angle detector, described in detail hereinbelow, is utilized, in step 66, to identify the screen parameters, as follows.

A dot 74, typically in the middle of the HT image and minimally away from the edges of the image, is identified and its center point calculated via a center of gravity calculation.

The descreener 12 then identifies dots 70 which are to the right and below dot 74 and their center points are calculated as described in more detail hereinbelow. The next dot chosen, dot 76, is that whose center is closest to the center of dot 74. In the manner described hereinabove, a multiplicity of dots 70 are found. If there is no available next dot, the dot search stops and a last dot 78 is identified. By "no available next dot" it is meant any dots, found to the right and below the last available dot, which do not pass a series of tests. An example test measures the angle between the found dot and the first dot 74. If it is significantly different than the angle between the other dots and the first dot 74 then the found dot is not valid. It will be noted that every dot found must pass the series of tests, described in more detail hereinbelow.

The first dot 74 and a last dot 78 serve as the two points needed in step 68 to calculate the screen angle $\theta$. The screen frequency is calculated, in step 68, by dividing the known number of dots between dots 74 and 78 by the distance between dots 74 and 78.

It will be appreciated that if dot 76 is close to 90° from dot 74, then the dot after dot 76 is the dot which is close to 90° from dot 76.

Reference is now made to FIG. 10 which illustrates, in pseudocode form, the operations of the screen mesh and angle detector for automatically identifying the screen mesh and angle. FIG. 10A is the main program and FIGS. 10B, 10C, 10D, 10E, 10F, 10G and 10H are subroutines called by the main program.

The detector, in the main program of FIG. 10A, finds the center of a first dot in a subroutine FIND_FIRST_POINT of FIG. 10H. Subsequently, a line of N dots are found in subroutine FIND_NEXT of FIG. 10B. From the center of the first dot, defined as $(X_1, Y_1)$, the center of the last point, defined as $(X_N, Y_N)$, and the number of dots N, the screen angle and cell size can be found, where the cell size defines the screen mesh.

The subroutine FIND_NEXT of FIG. 10B searches in one of three directions for a candidate next dot. The three directions are typically right, 45° and down.

Subroutine GO_NEXT of FIG. 10C finds the beginning of a candidate next dot and subroutine FIND_MAX of FIG. 10D finds the location of its maximal intensity value. Subsequently, subroutine FIND_CENTER_OF_GRAVITY of FIG. 10E finds the center of gravity of the dot.

The three dots thus found are then compared to previously found dots, in subroutine TEST_RESULTS of FIG. 10G, and the one closest to the previous dot is chosen. If none of the dots pass the entirety of the series of tests, an invalid result is declared and the subroutine is exited. The previous dot is then declared the last dot and the screen mesh and angle calculations are performed by the routine MAIN. Otherwise, subroutine FIND_NEXT is recursively performed to find the next dots.

It will be noted that all of the subroutines update the (X,Y) coordinates of the current dot.

Subroutine GO_NEXT starts from the location of the maximum value, as found by the subroutine FIND_MAX, and moves in the given direction, constantly calculating the intensity gradient as follows:

$$g_i = P_{i+1} - P_i \tag{10}$$

where i is the current pixel and i+1 is the next one in the given direction. Once $g_i$ changes sign, GO_NEXT ends, giving the (X,Y) coordinates to subroutine FIND_MAX.

Subroutine FIND_MAX of FIG. 10D recur 7@3

In the routine MAIN, the angle of the line is the angle between the last dot and the first dot and the cell size is the average distance between dots. N is the number of dots in the line 94.

The first dot is found, in subroutine FIND_FIRST_POINT of FIG. 10H, by beginning at a predetermined point, such as (0,0), and performing subroutines GO_NEXT, FIND_MAX, and FIND_CENTER_OF_GRAVITY until the center point of a dot is found. $(X_1,Y_1)$ is defined as the center point found.

It will be appreciated that it is possible to repeat the above operations a number of times, each time starting at a different initial point. In this manner, a number of lines 94 are defined. The screen angle is then the average of the angles of the lines and the cell size is the average of the average distances between points of the lines.

The above described operations are useful for dots which are distinct from each other. It is possible that, due to the intensity of the color represented, the dots will be large and will at least partially overlap one another. Therefore, it is preferable to repeat the above described process on the negative of the HT separation. The screen mesh and angle are defined from the operations which produce, on average, the largest number of points per line 94.

Similarly, when the screen frequency is low, the dots are large and noise can cause the subroutine GO_NEXT to stop at incorrect locations. To overcome such a problem, the above described process is repeated after the HT separation is clipped below a predetermined threshold to remove the noise and then filtered with a low pass filter which is operative to artificially produce a smooth gradient between the clipped dots such that GO_NEXT can operate. The clipping involves changing all intensity values less than a threshold to a zero value and not affecting the other values.

Figure 14:
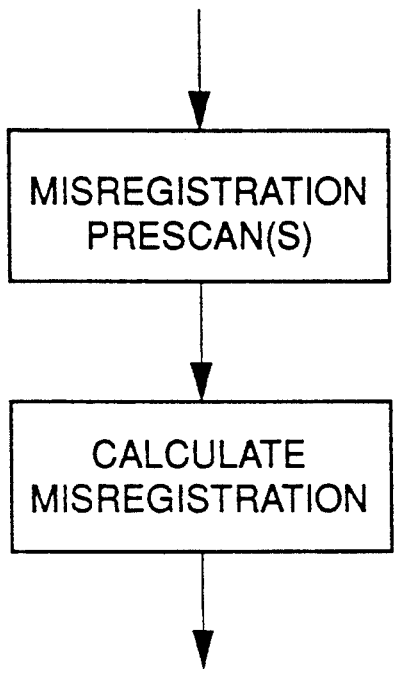
FIG. 14 is a partial flow chart illustration of a method of evaluating misregistration between color separations of an input image forming part of the flow chart of FIG. 7.
Figure 15:
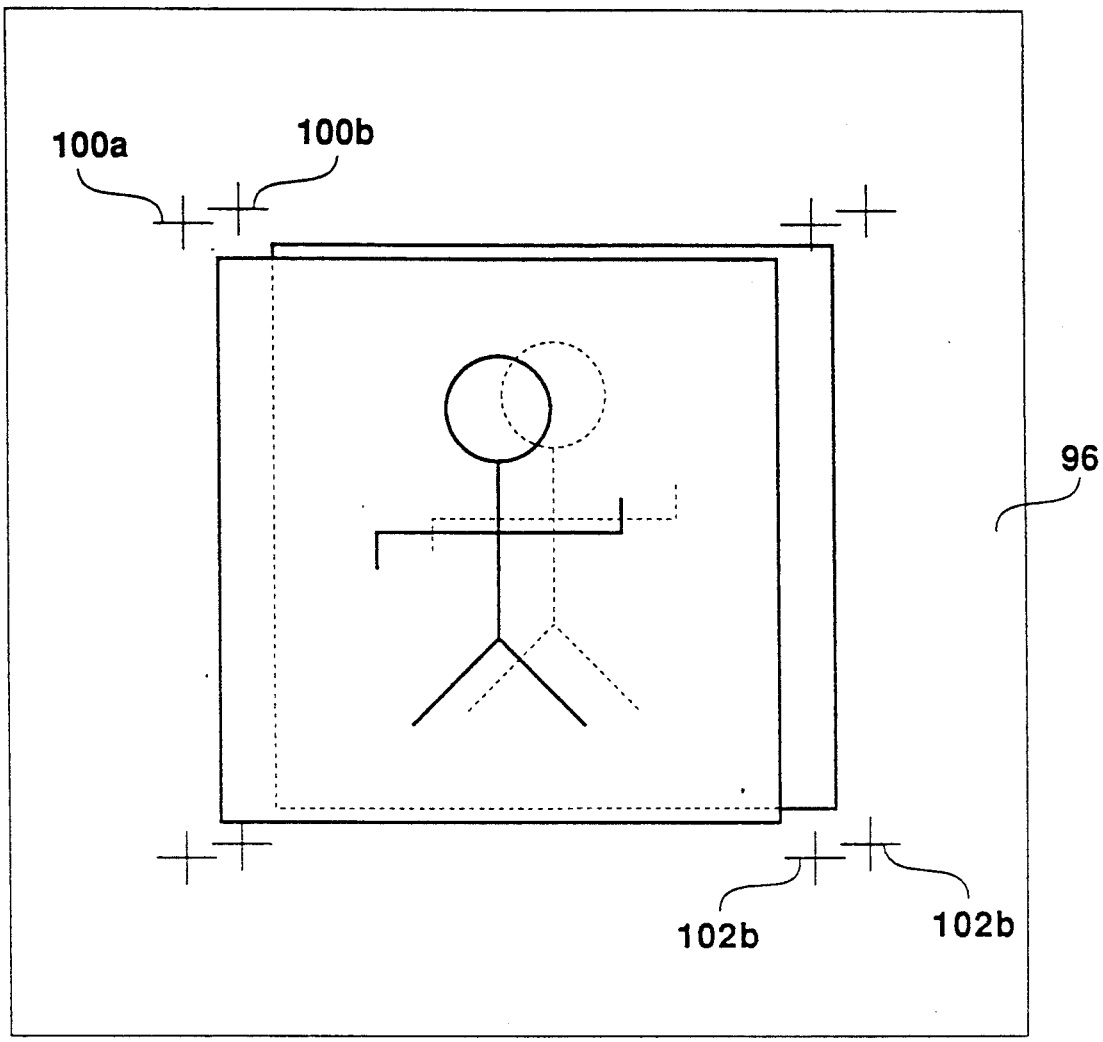
FIG. 15 is a pictorial illustration of two misregistered color separations, useful in understanding the method of FIG. 14.

Reference is made now to FIG. 14 which illustrates the steps involved in performing step 54, evaluating misregistration, and to FIG. 15 which illustrates an HT image printed on a substrate 96. The HT image includes registration marks 100 and 102 outside of the image space. Typically, there is a registration mark 100 and 102 for each color separation and the marks 100 and 102 are typically crosses. FIG. 15 shows two separations, two registration marks 100a and 100b in the upper left corner and two registration marks 102a and 102b in lower right corner of substrate 96. Registration marks 100a and 102a belong to the first separation and marks 100b and 102b belong to the second separation.

Misregistration is typically evaluated by first performing a misregistration prescan of each of the registration marks 100. The vector distance of each subsequent mark 100, such as 100b, to an arbitrarily defined first mark, such as 100a, is calculated by means of cross-correlation calculations, as described in more detail hereinbelow. This produces translation misregistration measurements.

It will be noted that the first mark 100a is typically defined as the registration mark of the first separation.

If it is desired to correct or test for angular misregistrations, then a second misregistration prescan is performed on registration marks 102. The misregistration between the marks 102 is identified and the rotation angle between the two separations is calculated. This process is described in more detail hereinbelow with respect to FIG. 18.

Figure 16:
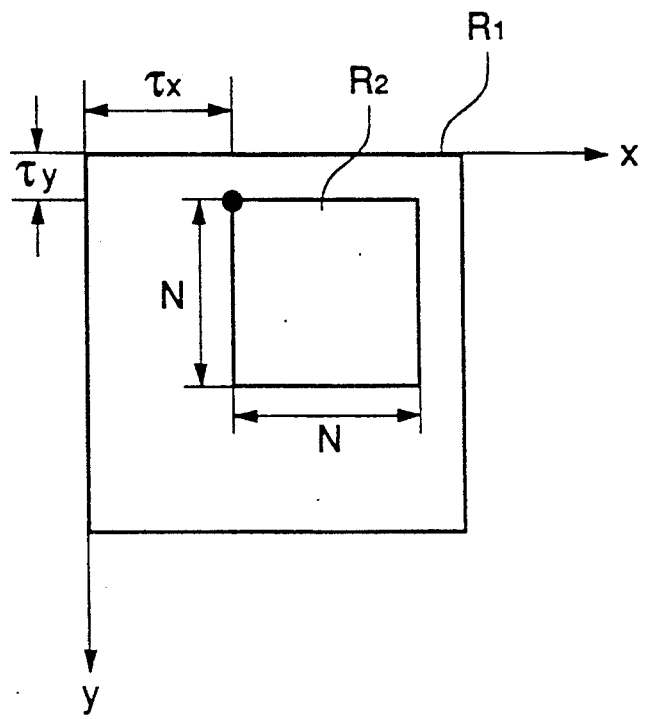
FIG. 16 is a pictorial illustration of a first image cross-correlated with a second image, useful in understanding the method of FIG. 14.

Translation misregistrations are preferably calculated using a correlation registration technique as described on pages 562–566 of the book entitled Digital Image Processing written by W. K. Pratt, published by John Wiley and Sons in 1978, and incorporated herein by reference. This technique calculates a two-dimensional cross-correlation array $C(\tau_x,\tau_y)$ by moving a typically $N \times N$ window of a second image $R_2(n_x,n_y)$, such as of registration mark 100b, over a first image $R_1(n_x,n_y)$, such as of registration mark 100a, and calculating the normalized sum of multiplications of the two images as follows:

$$C(\tau'_x,\tau'_y) = \frac{\Sigma\Sigma R_1(n_x + \tau'_x, n_y + \tau'_y) * R_2(n_x,n_y)}{\sqrt{(\Sigma\Sigma R_2^2(n_x,n_y))} * \sqrt{(\Sigma\Sigma R_1^2(n_x + \tau'_x, n_y + \tau'_y))}} \quad (11)$$

where $\tau'_x$ and $\tau'_y$ are the amounts of the displacement, in units of pixels, between the two images $R_1$ and $R_2$ and are illustrated in FIG. 16. The sums in equation 11 are performed for $n_x$, $n_y$ varying between 0 and $N-1$.

The element at location $(\tau'_{xm},\tau'_{ym})$ of $C(\tau'_x,\tau'_y)$ which has the maximum value approximately defines the translation vector, in units of pixels.

Sub-pixel misregistration is typically estimated by describing a "surface" around the pixel location $(\tau'_{xm},\tau'_{ym})$ which fulfills certain predetermined criteria. The surface is preferably defined in accordance with one of the following two continuous approximation methods. The methods are defined for a one-dimensional case, the two-dimensional case is an obvious extension of the one-dimensional case.

For the one-dimensional case, $\tau_m$ is the location of the sub-pixel maximum and $C(\tau)$ is defined as follows:

$$C(\tau) = \frac{\Sigma R_1(n + \tau) * R_2(n)}{\sqrt{(\Sigma R_2^2(n))} * \sqrt{(\Sigma R_1^2(n + \tau))}} \quad (12)$$

In accordance with a first method, $C(\tau)$ can be approximated as a polynomial $C^{\sim}(\tau)$ passing through $C(\tau_m-1)$, $C(\tau_m)$ and $C(\tau_m+1)$. In the interest of clarity, $C(\tau)$ can be defined to be centered at $\tau_m$, in which case, the polynomial $C^{\sim}(\tau)$ passes through $C(-1)$, $C(0)$, and $C(1)$.

For example, $C^{\sim}(\tau)$ can be defined as:

$$C^{\sim}(\tau) = A_0 + A_1\tau + A_2\tau^2 \quad (13)$$

$A_0$, $A_1$ and $A_2$ are then defined as:

$$A_0 = C(0) \quad (14)$$

$$A_1 = (C(1) - C(-1))/2 \quad (15)$$

$$A_2 = (C(1) - 2C(0) + C(-1))/2 \quad (16)$$

and $\tau_m$, which is the maximal value of $C^{\sim}(\tau)$, is then:

$$\tau_m = 0.5*(C(-1) - C(1))/(C(-1) - 2C(0) + C(1)) \quad (17)$$

$\tau_m$ is the sub-pixel level misregistration.

In accordance with a second method, the maximal value of $C^{\sim}(\tau)$ is calculated in accordance with a least squares approximation. Four points near the first, pixel level resolution, maximum are chosen for the calculation. As in the previous method, $C^{\sim}(\tau)$ is approximated as a polynomial and $A_0$, $A_1$ and $A_2$ are chosen to minimize E where E is defined as:

$$E = \sum_{n=-1}^{+2} [C(n) - (A_0 + A_1 n + A_2 n^2)]^2 \quad (18)$$

The $A_i$ are calculated by minimizing equation 18 and setting the partial derivatives of E with respect to the $A_i$ to 0. This provides the function $C^\sim(\tau)$. The value of $\tau_m$, the value of the sub-pixel level misregistration, is found by maximizing $C^\sim(\tau)$ through setting its derivative with respect to $\tau$ to zero.

Figure 17:
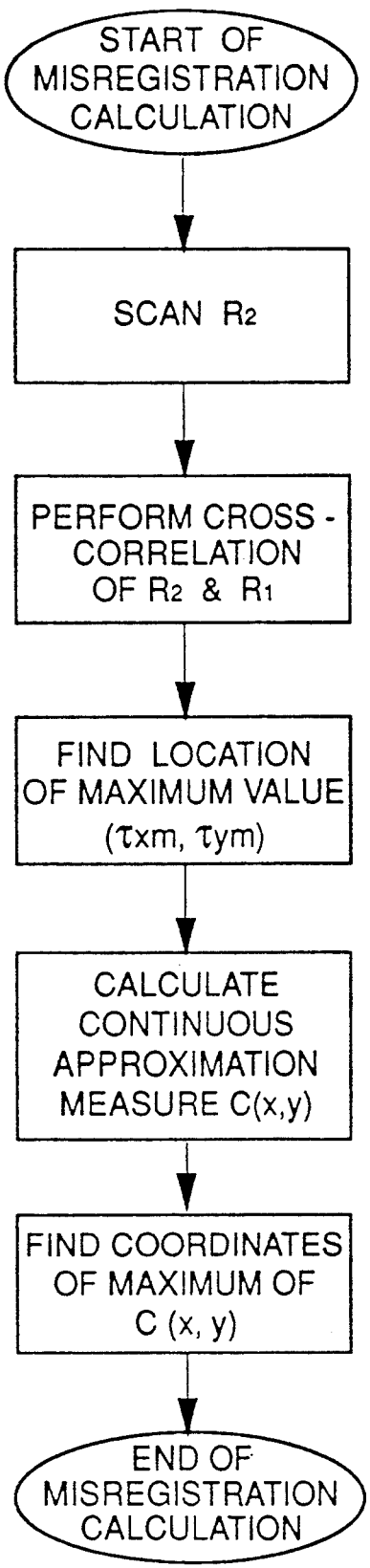
FIG. 17 is a flow chart illustration of a method of measuring translatory misregistration useful in the method of FIG. 14.

FIG. 17 is a flow chart of the operations of the misregistration method described hereinabove performed on images $R_1$ and $R_2$ where $R_1$ has already been scanned. It is believed to be self-explanatory.

Figure 18:
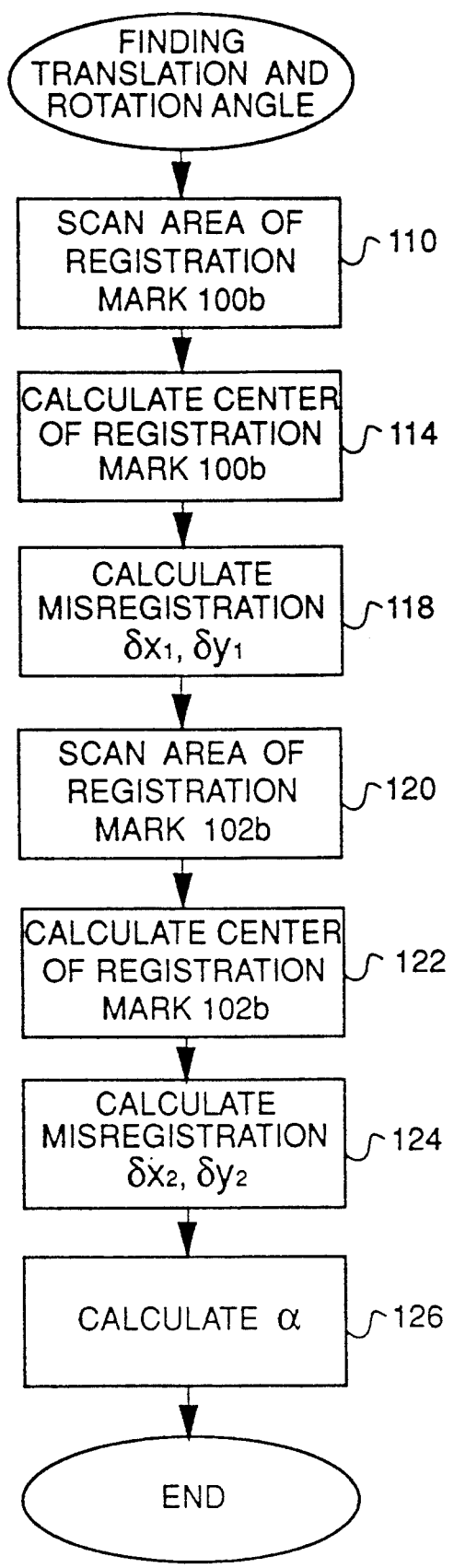
FIG. 18 is a flow chart illustration of a method of measuring angular and translatory misregistration useful in the method of FIG. 14.

Reference is now made to FIG. 18 which outlines the operations necessary for calculating a misregistration which includes an angular displacement. A misregistration prescan is performed, in steps 110 and 120, of the areas around registration marks 100b and 102b, respectively.

The centers of marks 100b and 102b are calculated, in steps 114 and 122, respectively, typically via the center of gravity method outlined hereinabove with respect to FIG. 10 for the screen mesh and angle detector, although other suitable methods are also possible. The centers of marks 100a and 102a are calculated at the time of processing the first separation and are stored.

Typically, the misregistration angle $\alpha$ is very small, on the order of tan $\alpha = 1/300$. Therefore, the cross-correlation and continuous approximation techniques described hereinabove for translation misregistrations are used, in steps 118 and 124, to measure the translation between registration marks 100a and 100b, denoted as $(\delta x_1, \delta y_2)$, and between registration marks 102a and 102b, denoted as $(\delta x_2, \delta y_2)$.

Figure 19:
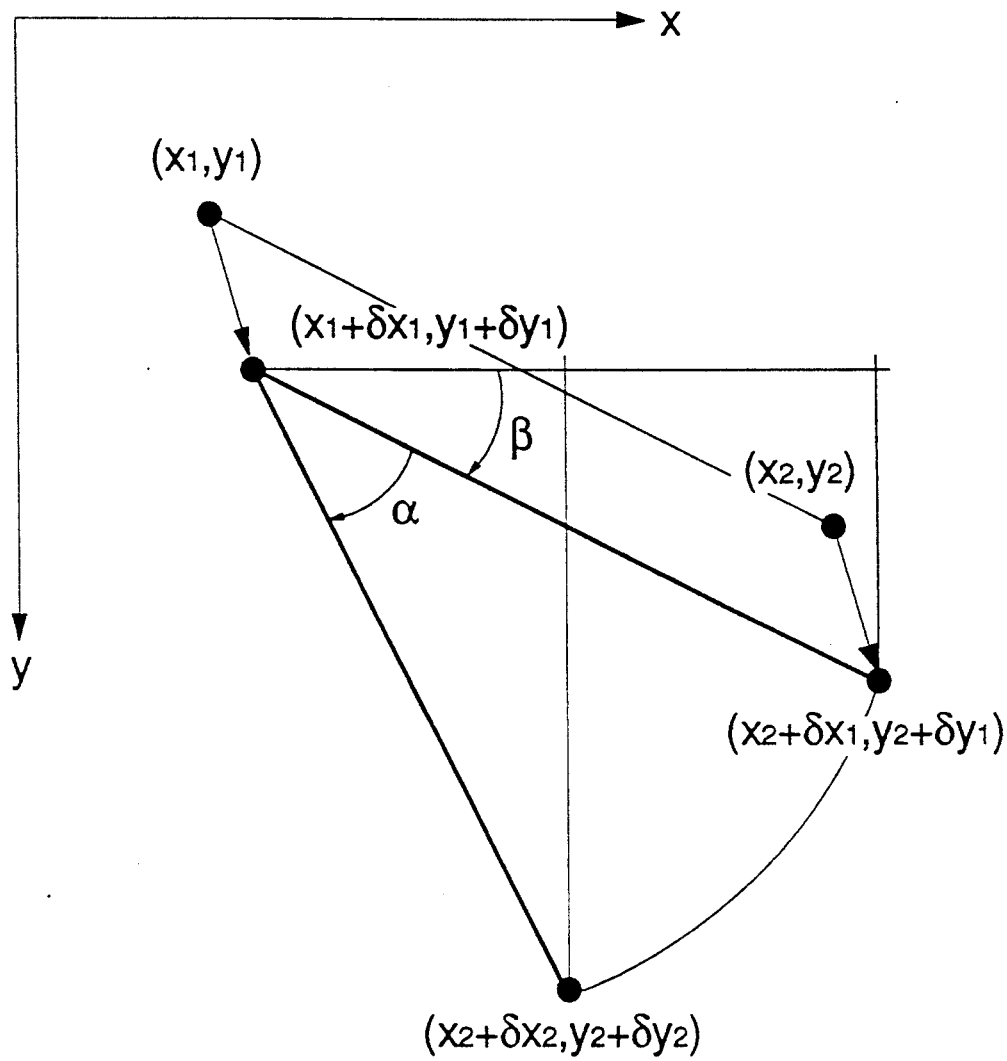
FIG. 19 is a pictorial illustration of a method of calculating the angular misregistration useful in the method of FIG. 18.

FIG. 19, to which reference is now briefly made, illustrates a translation with a rotation angle $\alpha$. The misregistration can be split into a translation portion and an angular portion. Thus, the misregistration can be viewed as a translatory misregistration from point $(X_1, Y_1)$ to point $(X_1 + \delta x_1, Y_1 + \delta y_1)$, causing a translation from point $(X_2, Y_2)$ to point $(X_2 + \delta x_1, Y_2 + \delta y_1)$, and an angular rotation misregistration of $\alpha$ from point $(X_2 + \delta x_1, Y_2 + \delta y_1)$ to point $(X_2 + \delta x_2, Y_2 + \delta y_2)$. The lin between point $(X_1 + \delta x_1, Y_1 + \delta y_1)$ and point $(X_2 + \delta x_1, Y_2 + \delta y_1)$ has an angle $\beta$ relative to the x axis. Through simple trigonometric calculations, it can be seen that $\alpha$ is:

$$\alpha = \arctan\left[\frac{(Y_2 + \delta y_2 - Y_1 - \delta y_1)}{(X_2 + \delta x_2 - X_1 - \delta x_1)}\right] - \arctan\left[\frac{(Y_2 - Y_1)}{(X_2 - X_1)}\right] \quad (19)$$

The angle $\alpha$ is calculated in step 126 of FIG. 18.

As described hereinabove, the descreening and resolution changing should begin at location $(X_1 + \delta x_1, Y_1 + \delta y_1)$ and should move across lines rotated by $\alpha$.

It will be appreciated that the descreener 12 can be any suitable computer, such as a stand-alone computer or a computing element forming part of a pre-press system. Typically, additional hardware, such as the TMS320C25 Digital Signal Processor manufactured by Texas Instruments, is added to the computer to perform the digital filtering operations.

Figure 21:
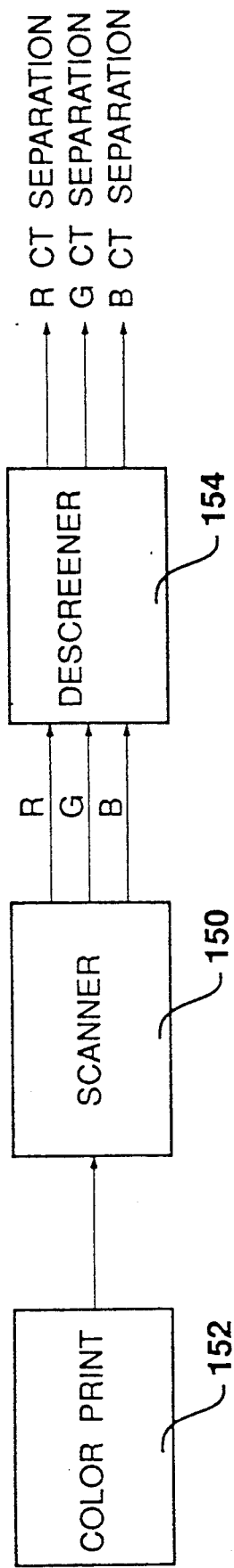
FIG. 21 is a block diagram illustration of an alternative embodiment of the present invention implemented in a color separation scanner.

Reference is now made to FIG. 21 which illustrates an alternative embodiment of the present invention for descreening color separation data from printed images. In this embodiment, a color separation scanner 150, such as the Smart Scanner manufactured by Scitex Corporation Ltd., scans a color print 152 which has typically been printed from four HT color separations in the Cyan, Magenta, Yellow and Black (CMYK) color coordinate system. The HT color separations can be produced with different screen frequencies and angles, if desired.

Scanner 150 produces from color print 152 three color separations, typically in the Red, Green, Blue (RGB) color coordinate system. It will be noted that, since scanner 150 does not measure CMYK but rather measures RGB, the RGB color separations are not HT separations but are a mixture of the CMYK HT separations. Thus, it is possible that the RGB color separations include more than one screen frequency and/or angle.

In accordance with this embodiment of the present invention, a descreener 154 is utilized to remove the screen information from each RGB color separation, thereby to produce continuous tone RGB color separations. Descreener 154 is constructed as described hereinabove wherein the screen removal portion of each of filters 20 is a circular low pass filter whose cutoff frequency is less than the entirety of the screen frequencies of the HT separations. It will be appreciated that descreener 154 operates on each of the RGB separations separately.

It will be appreciated by persons skilled in the art that the present invention is not limited to what has been particularly shown and described hereinabove. Rather, the scope of the present invention is defined only by the claims that follow:

We claim:

1. Apparatus for descreening and for performing resolution changes on a half-tone image in order to produce a continuous tone image comprising:
    filter means for removing screen information from said half-tone image comprising a plurality of different filters each providing interpolation and screen removal functions; and
    a controller for selecting per pixel of said continuous tone image and as a function of desired output resolution, one of said filters for operation on a neighborhood of said pixel.

2. Apparatus according to claim 1 and wherein said interpolation functions are provided by a plurality of frequency domain phase shifts.

3. Apparatus according to claim 1 and wherein said interpolation functions are provided by a plurality of sampled interpolation functions.

4. Apparatus according to claim 1 and wherein each of said filters is applied in a spatial domain.

5. Apparatus according to claim 1 and wherein said screen removal functions are provided by screen removal filter means for removing the entirety of frequencies at and above a predetermined frequency, wherein said frequency is a function of screen parameters.

6. Apparatus according to claim 5 and wherein said filter means are circular.

7. Apparatus according to claim 6 and wherein said screen removal filter means are low pass filters calculated according to a window method selected from the group of Hamming, Blackman, Dolph-Chebyshev and Blackman-Harris window methods.

8. Apparatus according to claim 5 and wherein said screen removal filter means are aligned with a predetermined screen angle.

9. Apparatus according to claim 5 and wherein said screen parameters are calculated on-the-fly and said screen removal functions are adjusted in accordance with the calculated screen parameters.

10. Apparatus according to claim 5 and wherein said screen removal filter means are low pass filters calculated according to a window method selected from the group of Hamming, Blackman, Dolph-Chebyshev or Blackman-Harris window methods.

11. Apparatus according to claim 1 and wherein said screen removal functions are provided by screen removal filter means for removing a screen frequency and its harmonics.

12. Apparatus according to claim 11 and wherein said filter means are circular.

13. Apparatus according to claim 11 and wherein said screen removal filter means are aligned with a predetermined screen angle.

14. Apparatus according to claim 11 and wherein said screen parameters are calculated on-the-fly and said screen removal functions are adjusted in accordance with the calculated screen parameters.

15. Apparatus according to claim 11 and wherein said screen removal filter means are low pass filters calculated according to a window method selected from the group of Hamming, Blackman, Dolph-Chebyshev or Blackman-Harris window methods.

16. Apparatus according to claim 1 and wherein said screen removal functions are provided by screen removal filter means for removing a screen frequency only.

17. Apparatus according to claim 16 and wherein said filter means are circular.

18. Apparatus according to claim 16 and wherein said screen removal filter means are aligned with a predetermined screen angle.

19. Apparatus according to claim 16 and wherein said screen parameters are calculated on-the-fly and said screen removal functions are adjusted in accordance with the calculated screen parameters.

20. Apparatus according to claim 16 and wherein said screen removal filter means are low pass filters calculated according to a window method selected from the group of Hamming, Blackman, Dolph-Chebyshev or Blackman-Harris window methods.

21. Apparatus for descreening and for performing resolution changes on a half-tone image in order to produce a continuous tone image comprising:
filter means for removing screen information from said half-tone image comprising a plurality of different filters each providing interpolation and screen removal functions; and
a controller for selecting per pixel of said continuous tone image and as a function of desired resolution changes, one of said filters for operation on a neighborhood of said pixel,
and wherein said controller comprises:
means for calculating the location of a next pixel in said continuous tone image;
means for choosing a location on a predefined grid closest to said location of said next pixel, said predefined grid being defined on said continuous tone image; and
means for selecting one of said filters in accordance with said location on said predefined grid.

22. Apparatus for descreening and for performing resolution changes on a color printed image thereby to produce a color continuous tone image, said color printed image being separated into a plurality of input color separations and said continuous tone image being separated into output color separations, said apparatus comprising:
filter means for removing screen information from each of said input color separations, said filter means comprising a plurality of different filters each providing interpolation and screen removal functions; and
a controller for selecting, per pixel of each of said output color separations and as a function of desired output resolution, one of said filters for operation on a neighborhood of said pixel.

23. Apparatus according to claim 22 and wherein said interpolation functions are provided by a plurality of frequency domain phase shifts.

24. Apparatus according to claim 22 and wherein said interpolation functions are provided by a plurality of sampled interpolation functions.

25. Apparatus according to claim 22 and wherein each of said filters is applied in a spatial domain.

26. Apparatus according to claim 22 and wherein said screen removal functions are provided by screen removal filter means for removing the entirety of frequencies at and above a predetermined frequency, wherein said frequency is a function of screen parameters.

27. Apparatus according to claim 22 and wherein said screen removal functions are provided by screen removal filter means for removing a screen frequency and its harmonics.

28. Apparatus according to claim 22 and wherein said screen removal functions are provided by screen removal filter means for removing a screen frequency only.

29. Apparatus according to claim 22 and wherein said printed image is produced from a plurality of half-tone images each having its respective screen frequency and wherein said screen removal functions are provided by circular screen removal filter means for removing the entirety of frequencies at and above a given frequency which is a function of said respective screen frequencies.

30. Apparatus according to claim 29 and wherein said screen removal filter means are low pass filters calculated according to a window method selected from the group of Hamming, Blackman, Dolph-Chebyshev or Blackman-Harris window methods.

31. Apparatus for descreening and for performing resolution changes on a color printed image thereby to produce a color continuous tone image, said color printed image being separated into a plurality of input color separations and said continuous tone image being separated into output color separations, said apparatus comprising:
filter means for removing screen information from each of said input color separations, said filter means comprising a plurality of different filters each providing interpolation and screen removal functions; and
a controller for selecting, per pixel of each of said output color separations and as a function of desired resolution changes, one of said filters for operations on a neighborhood of said pixel, and wherein said controller comprises:
means for calculating the location of a next pixel in said continuous tone image;
means for choosing a location on a predefined grid closest to said location of said next pixel, said predefined grid being defined on said continuous tone image; and
means for selecting one of said filters in accordance with said location on said predefined grid.

32. A method for descreening and for performing resolution changes on a half-tone image in order to produce a continuous tone image including the step of:
removing screen information from said half-tone image via a plurality of different filters each providing interpolation and screen removal functions;
said step of removing including the step of selecting, per pixel of said continuous tone image and as a function of desired output resolution, one of said filters for operation on a neighborhood of said pixel.

33. A method according to claim 32 and wherein said interpolation functions are provided by a plurality of frequency domain phase shifts.

34. A method according to claim 32 and wherein said interpolation functions are provided by a plurality of sampled interpolation functions.

35. A method according to claim 32 and wherein said step of removing screen information is performed in a spatial domain.

36. A method according to claim 32 and wherein said screen removal functions are provided by screen removal filter means for removing the entirety of frequencies at and above a predetermined frequency, wherein said frequency is a function of said screen frequency.

37. A method according to claim 36 and wherein said filter means are circular.

38. A method according to claim 37 and wherein said screen removal filter means are low pass filters calculated according to a window method selected from the group of Hamming, Blackman, Dolph-Chebyshev or Blackman-Harris window methods.

39. A method according to claim 36 and wherein said screen removal filter means are aligned with a predetermined screen angle.

40. A method according to claim 36 and wherein said screen removal filter means are low pass filters calculated according to a window method selected from the group of Hamming, Blackman, Dolph-Chebyshev or Blackman-Harris window methods.

41. A method according to claim 32 and wherein said screen removal functions are provided by screen removal filter means for removing a screen frequency and its harmonics.

42. A method according to claim 41 and wherein said filter means are circular.

43. A method according to claim 41 and wherein said screen removal filter means are aligned with a predetermined screen angle.

44. A method according to claim 41 and wherein said screen removal filter means are low pass filters calculated according to a window method selected from the group of Hamming, Blackman, Dolph-Chebyshev or Blackman-Harris window methods.

45. A method according to claim 32 and wherein said screen removal functions are provided by screen removal filter means for removing a screen frequency only.

46. A method according to claim 45 and wherein said filter means are circular.

47. A method according to claim 45 and wherein said screen removal filter means are aligned with a predetermined screen angle.

48. A method according to claim 45 and wherein said screen removal filter means are low pass filters calculated according to a window method selected from the group of Hamming, Blackman, Dolph-Chebyshev or Blackman-Harris window methods.

49. A method for descreening and for performing resolution changes on a color printed image thereby to produce a color continuous tone image, said color printed image being separated into a plurality of color separations and said continuous tone image being separated into output color separations, said method comprising the step of:
removing screen information from each of said color separations via a plurality of different filters each providing interpolation and screen removal functions;
said step of removing including the step of selecting, per pixel of each of said output color separations and as a function of desired output resolution, one of said filters for operation on a neighborhood of said pixel.

50. A method according to claim 49 and wherein said interpolation functions are provided by a plurality of frequency domain phase shifts.

51. A method according to claim 49 and wherein said interpolation functions are provided by a plurality of sampled interpolation functions.

52. A method according to claim 49 and wherein said step of removing screen information is performed in a spatial domain.

53. A method according to claim 49 and wherein said screen removal functions are provided by screen removal filter means for removing the entirety of frequencies at and above a predetermined frequency, wherein said frequency is a function of said screen frequency.

54. A method according to claim 49 and wherein said screen removal functions are provided by screen removal filter means for removing a screen frequency and its harmonics.

55. A method according to claim 49 and wherein said screen removal functions are provided by screen removal filter means for removing a screen frequency only.

56. A method according to claim 49 and wherein said printed image is produced from a plurality of half-tone images each having its respective screen frequency and wherein said screen removal functions are provided by circular screen removal filter means for removing the entirety of frequencies at and above a given frequency which is a function of said respective screen frequencies.

57. A method according to claim 56 and wherein said screen removal filter means are aligned with a predetermined screen angle.

58. A method according to claim 56 and wherein said screen removal filter means are low pass filters calculated according to a window method selected from the group of Hamming, Blackman, Dolph-Chebyshev or Blackman-Harris window methods.

59. A method for descreening and for performing resolution changes on a half-tone image in order to produce a continuous tone image including the step of:

removing screen information from said half-tone image via a plurality of different filters each providing interpolation and screen removal functions;

said step of removing including the step of selecting, per pixel of said continuous tone image and as a function of desired resolution changes, one of said filters for operation on a neighborhood of said pixel, and wherein said step of selecting includes the steps of:

calculating the location of a next pixel in said continuous tone image;

choosing a location on a predefined grid closest to said location of said next pixel, said predefined grid being defined on said continuous tone image; and selecting one of said filters in accordance with said location on said predefined grid.

60. A method for descreening and for performing resolution changes on a color printed image thereby to produce a color continuous tone image, said color printed image being separated into a plurality of color separations and said continuous tone image being separated into output color separations, said method comprising the step of:

removing screen information from each of said color separations via a plurality of different filters each providing interpolation and screen removal functions;

said step of removing including the step of selecting, per pixel of each of said output color separations and as a function of desired resolution changes, one of said filters for operation on a neighborhood of said pixel, and wherein said step of selecting includes the steps of:

calculating the location of a next pixel in said continuous tone image;

choosing a location on a predefined grid closest to said location of said next pixel, said predefined grid being defined on said continuous tone image; and selecting one of said filters in accordance with said location on said predefined grid.

61. Apparatus for descreening comprising:

filter means for removing screen information from an image comprising anti-aliasing filter means and screen removal filter means, wherein said anti-aliasing filter means comprises means for changing resolution of the image and wherein said anti-aliasing filter means comprises means for accommodating misregistration of the image.

* * * * *

UNITED STATES PATENT AND TRADEMARK OFFICE
CERTIFICATE OF CORRECTION

PATENT NO. : 5,333,064

DATED : July 26, 1994

INVENTOR(S) : Daniel SEIDNER, et al.

It is certified that error appears in the above-identified patent and that said Letters Patent is hereby corrected as shown below:

On the title page, add the following:

item 56 References Cited

-- US PATENTS

| | | |
|---|---|---|
| 4,082,431 | 4/78 | Ward, III |
| 4,326,252 | 4/82 | Kohno, et al. |
| 3,885,224 | 5/75 | Klahr |
| 4,082,429 | 4/78 | Ward, III et al. |
| 4,259,694 | 3/81 | Liao |
| 4,942,480 | 7/90 | Shu |
| 4,987,496 | 1/91 | Grievenkamp, Jr. |
| 4,941,185 | 7/90 | Reed |
| 4,975,784 | 12/90 | Sciaretta |
| 4,516,175 | 5/85 | Jung, et al. |
| 4,231,656 | 11/80 | Dickey, et al. |
| 4,403,258 | 9/83 | Balzan, et al. |
| 5,140,441 | 8/8/92 | Sugiura, et al. |

UNITED STATES PATENT AND TRADEMARK OFFICE
CERTIFICATE OF CORRECTION

PATENT NO. : 5,333,064

DATED : July 26, 1994

INVENTOR(S) : Daniel SEIDNER, et al.

It is certified that error appears in the above-identified patent and that said Letters Patent is hereby corrected as shown below:

FOREIGN PATENTS

| | | |
|---|---|---|
| 1 394 744 | 5/75 | GB |
| 3 217 752 | 5/82 | DE |
| 0 301 786 | 2/89 | EPO |
| 0 195 563 | 9/86 | EPO |
| 0 074 795 | 3/83 | EPO |
| 0 200 814 | 11/86 | EPO |
| 0 319 976 | 6/89 | EPO |

OTHER PUBLICATIONS

W. K. Pratt, "Digital Image Processing", John Wiley and Sons, 1978, pp. 93-120, 278-282.

Olof Bryngdahl, "Halftone Images: Spatial Resolution and Tone Reproduction", J. Opt. Soc. Am., Vol. 68, No. 3, March 1978.

J. C. Stoffel, et al., "A Survey of Electronic Techniques for Pictorial Image Reproduction", IEEE Trans. of Comm., Vol. COM-29, No. 12, Dec. 1981.

UNITED STATES PATENT AND TRADEMARK OFFICE
CERTIFICATE OF CORRECTION

PATENT NO. : 5,333,064

DATED : July 26, 1994

INVENTOR(S) : Daniel SEIDNER, et al.

It is certified that error appears in the above-identified patent and that said Letters Patent is hereby corrected as shown below:

OTHER PUBLICATIONS

A.V. Oppenheim, et al., "Digital Signal Processing", Prentice-Hall, 1975, pp. 239-250.

R.C. Gonzalez, et al., "Digital Image Processing", Addison-Wesley, 1977, pp. 218-233

L.R. Rabiner, et al., "Theory and Application of Digital Signal Processing", Prentice-Hall, Inc., 1975.

F.J. Harris, "On the Use of Windows for Harmonic Analysis with the Discrete Fourier Transform", Proc. of the IEEE, Vol. 66, No. 1, Jan. 1978, pp. 51-84.

Michael R. Warpenburg, "SIMD Image Resampling". IEEE Trans. on Computers Vol. C-31, No. 10, October, 1982, New York, PP. 932-942.

Patent Abstracts of Japan, Vol. 014, No. 257 (E-0936) June 4, 1990

Signed and Sealed this

Fourth Day of April, 1995

*Attest:*

BRUCE LEHMAN

*Attesting Officer*  *Commissioner of Patents and Trademarks*